United States Patent [19]
Woodbridge et al.

[11] Patent Number: 5,832,440
[45] Date of Patent: Nov. 3, 1998

[54] TROLLING MOTOR WITH REMOTE-CONTROL SYSTEM HAVING BOTH VOICE—COMMAND AND MANUAL MODES

[75] Inventors: Donald A. Woodbridge, Austin; Erik Ruiz, Cedar Park, both of Tex.

[73] Assignee: DACE Technology, Austin, Tex.

[21] Appl. No.: 968,903

[22] Filed: Nov. 6, 1997

Related U.S. Application Data

[63] Continuation of Ser. No. 661,132, Jun. 10, 1996, abandoned.

[51] Int. Cl.$^6$ .............................. G10L 9/06; B63H 25/00
[52] U.S. Cl. ................ 704/275; 114/144 A; 114/144 RE
[58] Field of Search ..................... 704/275; 114/144 RE, 114/144 A

[56] References Cited

U.S. PATENT DOCUMENTS

| | | | |
|---|---|---|---|
| H891 | 2/1991 | Hashimoto | 395/2.84 |
| 3,485,951 | 12/1969 | Hooper, Jr. | 395/2.58 |
| 3,588,363 | 6/1971 | Herscher et al. | 395/2.62 |
| 3,598,947 | 8/1971 | Osborn | 200/86.5 |
| 3,742,143 | 6/1973 | Awipi | 379/355 |
| 3,807,345 | 4/1974 | Peterson | 440/7 |
| 3,946,157 | 3/1976 | Dreyfus | 395/2.63 |
| 4,114,074 | 9/1978 | Stewart et al. | 318/257 |
| 4,207,959 | 6/1980 | Youdin et al. | 180/167 |
| 4,275,266 | 6/1981 | Lasar | 395/2.84 |
| 4,302,749 | 11/1981 | Ylonen | 367/198 |
| 4,359,604 | 11/1982 | Dumont | 395/2.42 |
| 4,388,495 | 6/1983 | Hitchcock | 395/2.63 |
| 4,389,109 | 6/1983 | Taniguchi et al. | 396/56 |
| 4,401,852 | 8/1983 | Noso et al. | 367/198 |
| 4,426,733 | 1/1984 | Brenig | 455/79 |
| 4,450,545 | 5/1984 | Kishi et al. | 367/198 |
| 4,459,674 | 7/1984 | Sakurai | 395/2.72 |
| 4,462,080 | 7/1984 | Johnstone et al. | 395/2.09 |
| 4,471,683 | 9/1984 | Brown | 89/1.11 |
| 4,472,617 | 9/1984 | Ueda et al. | 60/641.11 |
| 4,493,100 | 1/1985 | Moriyama et al. | 395/2.84 |
| 4,501,012 | 2/1985 | Kishi et al. | 395/2.84 |
| 4,506,142 | 3/1985 | Takano et al. | 219/490 |
| 4,506,378 | 3/1985 | Noso et al. | 395/2.84 |
| 4,513,189 | 4/1985 | Ueda et al. | 219/714 |
| 4,516,207 | 5/1985 | Moriyama et al. | 364/424.045 |
| 4,520,500 | 5/1985 | Mizuno et al. | 395/2.57 |
| 4,520,576 | 6/1985 | Vander Molen | 34/534 |
| 4,528,687 | 7/1985 | Noso et al. | 395/2.84 |
| 4,531,228 | 7/1985 | Noso et al. | 395/2.84 |
| 4,538,295 | 8/1985 | Noso et al. | 395/2.57 |
| 4,556,944 | 12/1985 | Daniels et al. | 364/464.17 |
| 4,558,459 | 12/1985 | Noso et al. | 395/2.42 |
| 4,590,604 | 5/1986 | Feilchenfeld | 395/2.82 |
| 4,593,403 | 6/1986 | Kishi et al. | 395/2.52 |
| 4,597,098 | 6/1986 | Noso et al. | 395/2.42 |
| 4,605,080 | 8/1986 | Lemelson | 177/4 |
| 4,635,286 | 1/1987 | Bui et al. | 395/2.45 |
| 4,637,045 | 1/1987 | Noso et al. | 395/2.84 |
| 4,641,292 | 2/1987 | Tunnell et al. | 367/198 |
| 4,641,342 | 2/1987 | Watanabe et al. | 395/2.62 |
| 4,717,364 | 1/1988 | Furukawa | 446/175 |
| 4,720,802 | 1/1988 | Damoulakis et al. | 395/2.42 |
| 4,725,956 | 2/1988 | Jenkins | 364/423.099 |

(List continued on next page.)

FOREIGN PATENT DOCUMENTS

| | | | |
|---|---|---|---|
| 57-73835 | 5/1982 | Japan | F02D 29/00 |
| 57-186593 | 12/1982 | Japan | B63B 21/16 |
| 62-95610 | 5/1987 | Japan | G05B 24/02 |
| 04-185597 | 7/1992 | Japan | B63H 25/00 |

*Primary Examiner*—Curtis A. Kuntz
*Assistant Examiner*—Tālivaldis Ivars Šmits
*Attorney, Agent, or Firm*—Conley, Rose & Tayon; B. Noel Kivlin

[57] ABSTRACT

A device for controlling the speed and direction of a watercraft using voice commands. The device includes a voice recognition computer, which recognizes spoken commands, and a motor control computer which causes the speed and steering direction of the watercraft to change in response to the spoken commands. A remote control beltpack unit with a radio or infrared link allows free movement of the operator while controlling the watercraft.

17 Claims, 20 Drawing Sheets

U.S. PATENT DOCUMENTS

| | | | |
|---|---|---|---|
| 4,737,976 | 4/1988 | Borth et al. | 379/58 |
| 4,739,236 | 4/1988 | Burkenpas | 318/588 |
| 4,776,016 | 10/1988 | Hansen | 395/2.84 |
| 4,797,924 | 1/1989 | Schnars et al. | 395/2.84 |
| 4,807,273 | 2/1989 | Haendle | 378/197 |
| 4,824,408 | 4/1989 | Aertker et al. | 440/6 |
| 4,827,520 | 5/1989 | Zeinstra | 395/2.84 |
| 4,856,072 | 8/1989 | Schneider et al. | 381/86 |
| 4,862,363 | 8/1989 | Krisher et al. | 364/424.088 |
| 4,864,623 | 9/1989 | Van Nes et al. | 395/2.84 |
| 4,868,879 | 9/1989 | Morito et al. | 395/2.57 |
| 4,876,676 | 10/1989 | Shimizu et al. | 368/63 |
| 4,882,685 | 11/1989 | van der Lely | 364/709.11 |
| 4,882,755 | 11/1989 | Yamada et al. | 395/2.48 |
| 4,897,878 | 1/1990 | Boll et al. | 395/2.42 |
| 4,905,286 | 2/1990 | Sedgwick et al. | 395/2.42 |
| 4,907,079 | 3/1990 | Turner et al. | 348/2 |
| 4,910,784 | 3/1990 | Doddington et al. | 395/2.6 |
| 4,918,735 | 4/1990 | Morito et al. | 395/2.42 |
| 4,937,871 | 6/1990 | Hattori | 395/2.42 |
| 4,951,079 | 8/1990 | Hoshino et al. | 396/56 |
| 4,955,834 | 9/1990 | Henderson et al. | 440/63 |
| 4,959,864 | 9/1990 | Van Nes et al. | 355/55 |
| 4,959,865 | 9/1990 | Stettiner et al. | 395/2.42 |
| 4,961,177 | 10/1990 | Uehara | 395/2.82 |
| 4,989,253 | 1/1991 | Liang et al. | 381/110 |
| 4,991,217 | 2/1991 | Garrett et al. | 395/2.44 |
| 4,995,010 | 2/1991 | Knight | 367/111 |
| 5,003,602 | 3/1991 | Koyama | 395/2.6 |
| 5,014,317 | 5/1991 | Kita et al. | 395/2.83 |
| 5,016,003 | 5/1991 | Rice, Jr. et al. | 340/825.19 |
| 5,027,149 | 6/1991 | Hoshino et al. | 396/56 |
| 5,041,029 | 8/1991 | Kulpa | 440/1 |
| 5,042,063 | 8/1991 | Sakanishi et al. | 395/2.58 |
| 5,050,519 | 9/1991 | Senften | 114/144 E |
| 5,069,642 | 12/1991 | Henderson | 440/6 |
| 5,078,070 | 1/1992 | Clement | 114/144 E |
| 5,088,943 | 2/1992 | Henderson | 440/6 |
| 5,108,322 | 4/1992 | Henderson | 440/7 |
| 5,112,256 | 5/1992 | Clement | 440/7 |
| 5,117,460 | 5/1992 | Berry et al. | 395/2.55 |
| 5,125,022 | 6/1992 | Hunt et al. | 379/88 |
| 5,127,043 | 6/1992 | Hunt et al. | 379/88 |
| 5,129,345 | 7/1992 | Senften | 114/144 E |
| 5,146,538 | 9/1992 | Sobti et al. | 395/2.1 |
| 5,146,539 | 9/1992 | Doddington et al. | 395/2.5 |
| 5,148,489 | 9/1992 | Erell et al. | 395/2.35 |
| 5,171,173 | 12/1992 | Henderson et al. | 440/7 |
| 5,172,324 | 12/1992 | Knight | 364/457 |
| 5,199,080 | 3/1993 | Kimura et al. | 381/110 |
| 5,202,835 | 4/1993 | Knight | 364/457 |
| 5,220,287 | 6/1993 | Astridge | 330/132 |
| 5,222,121 | 6/1993 | Shimada | 379/88 |
| 5,222,147 | 6/1993 | Koyama | 395/2.58 |
| 5,226,090 | 7/1993 | Kimura | 381/110 |
| 5,228,087 | 7/1993 | Bickerton | 395/2.41 |
| 5,230,023 | 7/1993 | Nakano | 381/110 |
| 5,239,586 | 8/1993 | Marui | 395/2.79 |
| 5,247,580 | 9/1993 | Kimura et al. | 395/2.84 |
| 5,255,341 | 10/1993 | Nakajima | 395/2.09 |
| 5,263,118 | 11/1993 | Cornelison | 395/2.09 |
| 5,267,323 | 11/1993 | Kimura | 381/110 |
| 5,274,560 | 12/1993 | LaRue | 364/444.2 |
| 5,278,910 | 1/1994 | Suzuki et al. | 395/2.45 |
| 5,291,193 | 3/1994 | Isobe et al. | 340/825.69 |
| 5,303,148 | 4/1994 | Mattson et al. | 128/660.01 |
| 5,303,299 | 4/1994 | Hunt et al. | 379/88 |
| 5,335,276 | 8/1994 | Thompson et al. | 380/21 |
| 5,335,313 | 8/1994 | Douglas | 395/2.84 |
| 5,345,226 | 9/1994 | Rice, Jr. et al. | 340/825.19 |
| 5,345,538 | 9/1994 | Narayannan et al. | 395/2.84 |
| 5,359,576 | 10/1994 | Bunner et al. | 367/197 |
| 5,362,263 | 11/1994 | Petty | 440/1 |
| 5,365,574 | 11/1994 | Hunt et al. | 379/88 |
| 5,371,800 | 12/1994 | Komatsu et al. | 395/2.34 |
| 5,371,901 | 12/1994 | Reed et al. | 455/69 |
| 5,375,063 | 12/1994 | Peck et al. | 364/470.07 |
| 5,386,368 | 1/1995 | Knight | 364/432 |
| 5,406,618 | 4/1995 | Knuth et al. | 379/67 |
| 5,420,912 | 5/1995 | Kopp et al. | 379/63 |
| 5,440,606 | 8/1995 | Faul et al. | 378/98 |

100 - AUDIO PREAMPLIFIER / FILTER

| VOICE COMMAND | FUNCTION |
| --- | --- |
| "LEFT" | Turn thrust motor left 22.5 degrees |
| "RIGHT" | Turn thrust motor right 22.5 degrees |
| "HARD LEFT" | Turn thrust motor left 90 degrees |
| "HARD RIGHT" | Turn thrust motor right 90 degrees |
| "STOP" | Set thrust motor speed to zero |
| "ONE" | Set thrust motor speed to one-quarter maximum thrust |
| "TWO" | Set thrust motor speed to one-half maximum thrust |
| "THREE" | Set thrust motor speed to three-quarter maximum thrust |
| "FOUR" | Set thrust motor speed to maximum thrust |
| "FASTER" | Increase thrust motor speed by 1/16th maximum thrust |
| "SLOWER" | Decrease thrust motor speed by 1/16th maximum thrust |
| "THRUST" | Start thrust motor |
| "NO THRUST" | Stop thrust motor |
| "REVERSE" | Turn thrust motor for reverse thrust |
| "FORWARD" | Turn thrust motor for forward thrust |
| "VOICE OFF" | Disable voice recognition |

FIG. 8

51 - BELTPACK UNIT PRINTED CIRCUIT BOARD (ALTERNATE EMBODIMENT)

TROLLING MOTOR WITH REMOTE-CONTROL SYSTEM HAVING BOTH VOICE— COMMAND AND MANUAL MODES

This application is a continuation of application Ser. No. 08/661,132, filed Jun. 10, 1996 now abandoned.

BACKGROUND OF THE INVENTION

1. Field of the Invention

This invention relates to the control of steering and propulsion on marine vehicles in general, and more particularly to the control of trolling motors used for fishing.

2. Description of the Relevant Art

Trolling motors are small motors which are primarily used to propel a boat during fishing. They are generally suitable for maneuvering a boat quietly, at relatively low speeds. A typical trolling motor includes a small fractional-horsepower electric motor mounted on the end of a shaft such that it can be lowered into the water. The electric motor turns a propeller which is the source of propulsion for the boat during trolling operation. The electric motor is usually powered by batteries on board the boat, with electric current transmitted by power cables which run through the hollow center of the shaft and connect to the motor. Steering is accomplished directly by turning the shaft, such that the direction of the thrust from the propeller changes.

Small internal combustion outboard motors are sometimes used as trolling motors, but the desire for quiet operation has led many fishermen to prefer the electric powered trolling motor. Electric powered trolling motors can be attached to either the bow, or the stern of the boat depending primarily on the preference of the operator. Stern mounted manual control electric trolling motors are usually the least expensive option, and typically have a control handle which can be twisted to vary the speed of the motor, or turned, to vary the thrust angle, thereby steering the boat. A primary disadvantage to stern mounted, manual control electric trolling motors is that the operator of the trolling motor is required to sit or stand in the back of the boat with one hand on the trolling motor control—a position not conducive to fishing.

Bow mounted electric trolling motors are typically mounted on a special folding mount which allows the trolling motor to be retracted when not in use. When a bow mounted electric trolling motor is in use, it operates in tractor fashion, pulling the boat through the water. Some bow mounted electric trolling motors have simple hand controls similar to the stern mounted motors, while many have a remote foot operated pedal which is used to steer the motor and change its speed. The steering mechanism of some foot controlled electric trolling motors is a mechanical linkage having a system of cables and gears. However, some foot operated trolling motors have a small electric steering motor which is capable of steering the trolling motor through various arrangements, and consequently the remote control foot pedal includes a number of electrical switches which are used to control the direction and speed of the trolling motor. Disadvantages to these previous trolling motor control methods is that they either require the operator to use a free hand to control the motor (manual control), or they require the operator to maintain one position in the boat (foot control). The use of a hand usually precludes fishing at the same time, while not being free to move about the boat may result in a snagged line when a hooked fish attempts to run under the boat.

There have therefore been numerous attempts to devise sophisticated trolling motor control systems to allow the operator to concentrate on fishing. Some such systems automatically maintain the set heading, regardless of wind or current. Others use acoustic depth finders along with a steering computer to automatically follow a given depth profile. Still others use a distance measuring method to maintain a fixed distance from the shore. A disadvantage to all of these systems is that often the boat must be maneuvered along a curved bank where the water depth changes abruptly, and where there are numerous obstructions such as partially or fully submerged trees. Operation in these conditions requires constant operator intervention to avoid obstacles and maintain the boat along a desired course.

SUMMARY OF THE INVENTION

The problems outlined above are in large part solved by a trolling motor with a voice-controlled control system in accordance with the present invention. In one embodiment, a trolling motor is equipped with a voice-controlled remote control system which utilizes a speech recognition computer to allow the operator to control the speed and direction of an electrically steered trolling motor by voice commands, thereby allowing the operator to freely move about the boat. The speech recognition computer may be contained within a remote unit such as a beltpack unit worn by the operator. The remote unit may include keys which can be used to manually control the trolling motor, providing another way to control when conditions are too noisy for reliable voice control. The beltpack control unit may provide electronic commands to the trolling motor using a radio or other wireless link.

The voice-controlled control system may further utilize a software gain control function wherein the average and/or peak signal levels associated with a spoken command by the operator are compared to the average and/or peak signal levels associated with a record stored in a recognizer memory. In response to detecting a difference between the signal levels of the spoken command and those of the record, a control computer calculates a new gain setting for the preamplifier which amplifies the spoken commands.

The voice-controlled control system may further be equipped with one or more power control circuits for controlling the application of power to selected components of the remote unit and/or of the trolling motor control circuitry. The power control circuitry advantageously reduces overall power consumption of the system.

The voice-controlled control system may still further employ a voice command vocabulary which provides reliable speech recognition capabilities and which provides ease of use for the operator. In one embodiment, the command set includes: "left", "right", "hard left", "hard right", "stop", "faster", "slower", "reverse", and "forward".

BRIEF DESCRIPTION OF THE DRAWINGS

Other objects and advantages of the invention will become apparent upon reading the following detailed description and upon reference to the accompanying drawings in which:

FIG. 8 is a list of exemplary voice commands and their functions.

Figure 1:
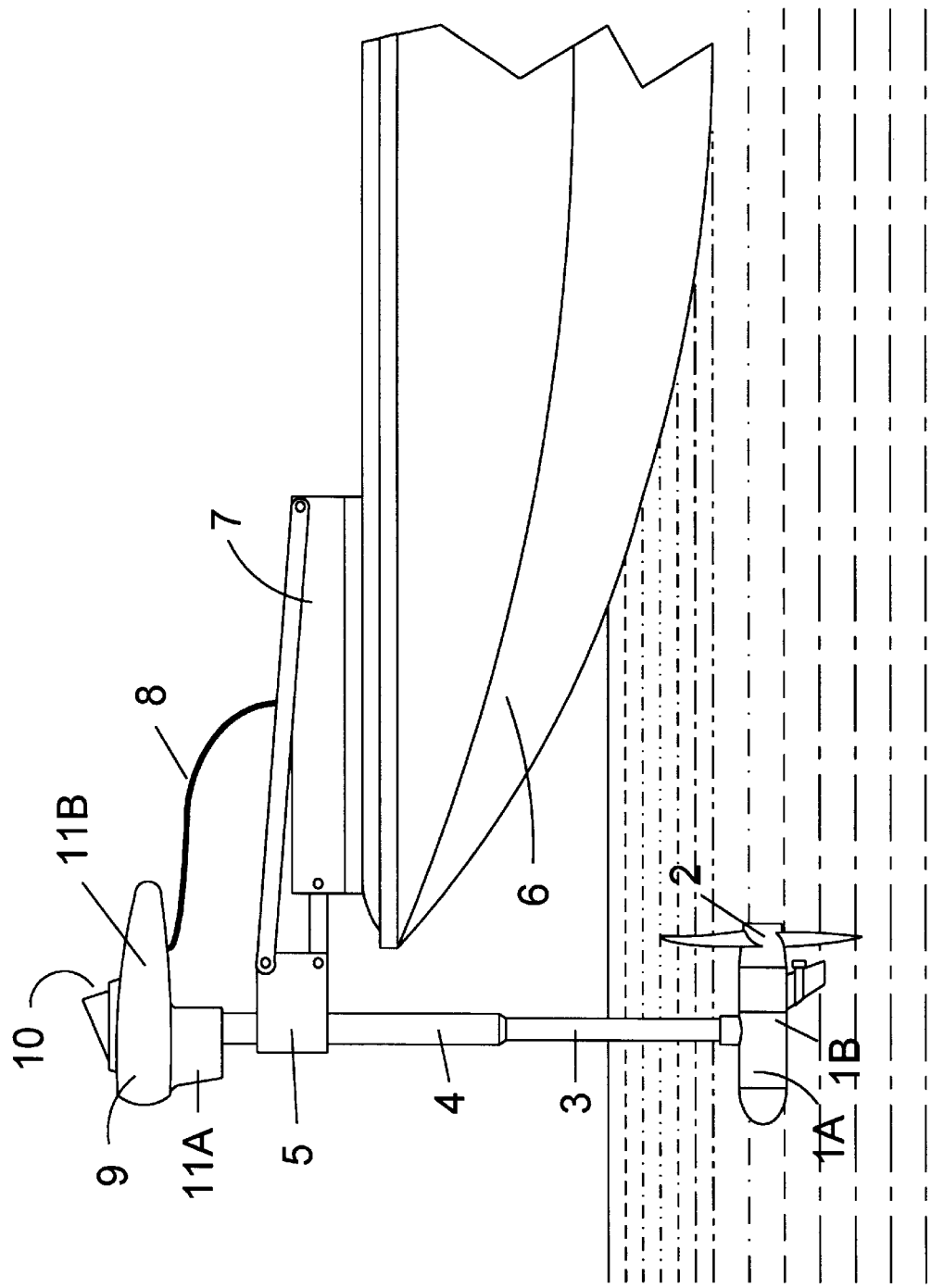
FIG. 1 is a side view of the bow of a fishing boat with a bow-mounted electric trolling motor attached.

While the invention is susceptible to various modifications and alternative forms, specific embodiments thereof are shown by way of example in the drawings and will herein be described in detail It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Turning now to the drawings, FIG. 1 shows an exemplary electric trolling motor mounted securely to the bow of a fishing boat in a manner which has become popular in the industry. The trolling motor has a submerged housing unit 1a that contains an electric thrust motor 1b which drives a propeller 2. The submerged housing unit is securely attached to a lower shaft 3 which extends up through an upper shaft 4 to the upper housing 9. The upper shaft 4 is held securely by a mounting block 5 which is attached to a folding deck mount 7 mounted on the deck of a fishing boat 6. The trolling motor is steered by turning the lower shaft by means of an electric steering motor 11a which is contained within the upper housing 9. A direction pointer 10 is also attached to the lower shaft 3, and turns along with it, providing visual feedback to the operator about the direction that the submerged housing unit 1a is pointing. Electric power is provided to the trolling motor by a power cable 8 which is connected to 12 V batteries on board the boat 6. A trolling motor control circuit 11b enclosed within the upper housing 9 controls the electric steering motor 11a and the electric thrust motor 1b.

Figure 2:
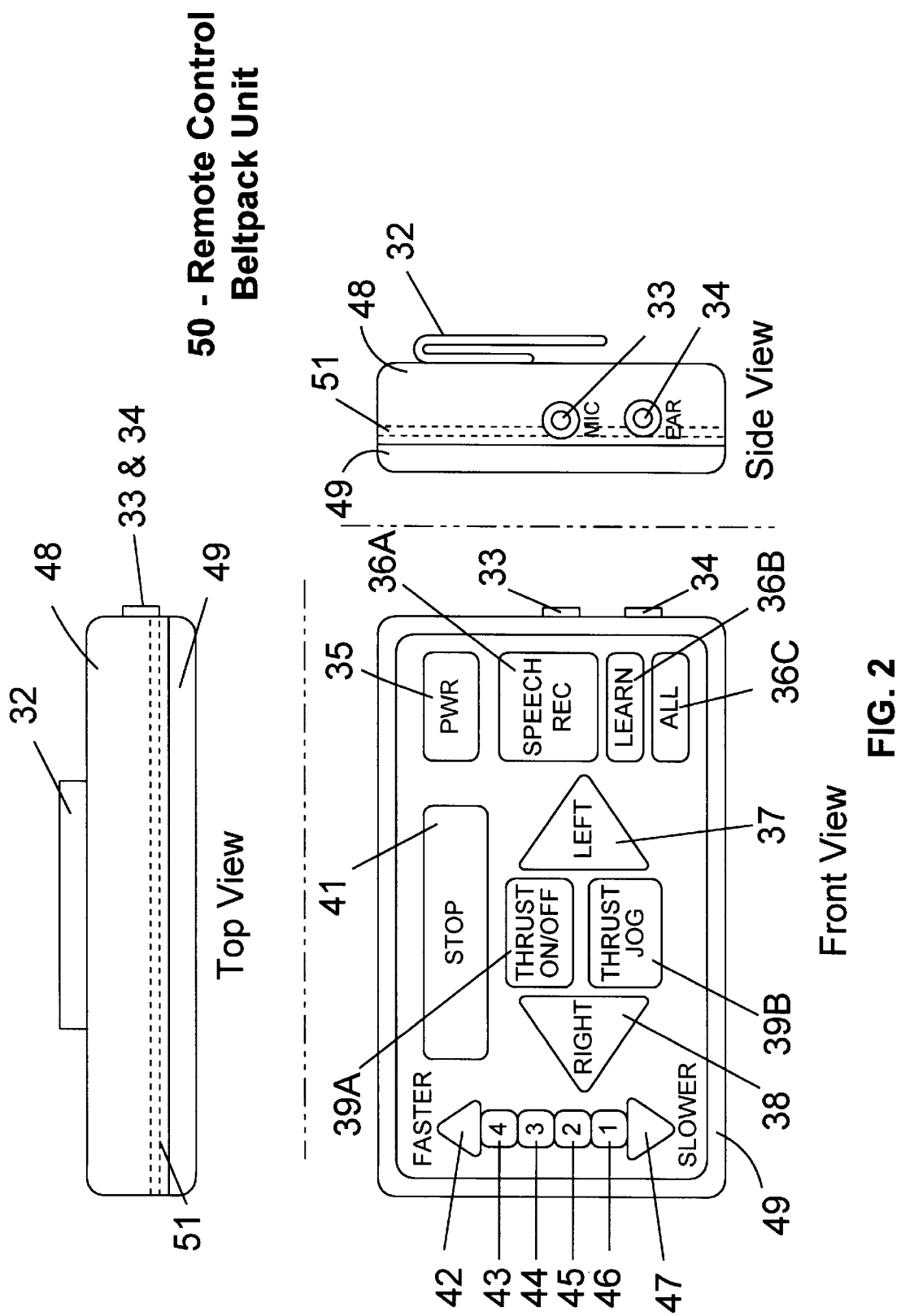
FIG. 2 is a drawing of an exemplary speaker dependent beltpack unit.

FIG. 2 shows a remote control beltpack unit 50 which can be used to remotely control the speed and direction of the trolling motor. A beltpack unit printed circuit board 51 is contained within an external waterproof housing 48 and 49. The external housing 48 and 49 has an external microphone connector 33, an external earphone connector 34 and a belt clip 32 for attaching it to the operator's belt.

Remote control beltpack unit 50 further includes a front keypad with individual keys for controlling various remote control system features. Several of the keys on the remote control beltpack unit 50 allow manual operation of the trolling motor, while still other keys are provided to control certain functionality related to voice control of the trolling motor. More specifically, for the implementation of FIG. 2, the PWR key 35 turns the beltpack unit power on or off. The RIGHT key 38 causes the steering motor 11a to turn the submerged housing unit 1a to the right. The LEFT key 37 causes the steering motor 11a to turn the submerged housing unit 1a to the left. The THRUST ON/OFF key 39a is used to turn the thrust motor 1b manually on or off. The THRUST JOG key 39b causes the thrust motor 1b to spin while it is held down. The ONE key 46 is used to set the speed of the thrust motor 1b to one-quarter of maximum thrust. The TWO key 45 is used to set the speed of the thrust motor 1b to one-half of maximum thrust. The THREE key 44 is used to set the speed of the thrust motor 1b to three-quarters of maximum thrust. The FOUR key 43 is used to set the speed of the thrust motor 1b to maximum thrust. The FASTER key 42 increases the speed of the thrust motor 1b by one-sixteenth of maximum thrust. The SLOWER key 47 key decreases the speed of the thrust motor 1b by one-sixteenth of maximum thrust. The STOP key 41 causes the thrust motor 1b to stop spinning. The VOICE REC key 36a is a toggle key which enables or disables voice commands. The LEARN key 36b is a toggle key which is used for training voice commands in a speaker dependent mode. As will be described further below, the speaker dependent mode allows circuitry within remote control beltpack unit 50 to "learn" the specific voice pattern of the operator for certain voice commands which control the trolling motor. More specifically, pressing the LEARN key once causes the unit to enter a "learn mode". In learn mode, the pressing of an additional key will cause the command corresponding to that key to be trained as will be explained in greater detail below in conjunction with the description of FIG. 10, FIG. 12, and FIG. 13a. If the ALL key 36c is pressed, all of the available voice commands are trained sequentially. This combination of keys allows the operator to train all commands at once, or to train an individual command by itself. The option of training a single command is useful when one of the trained commands is not being recognized reliably.

Figure 3:
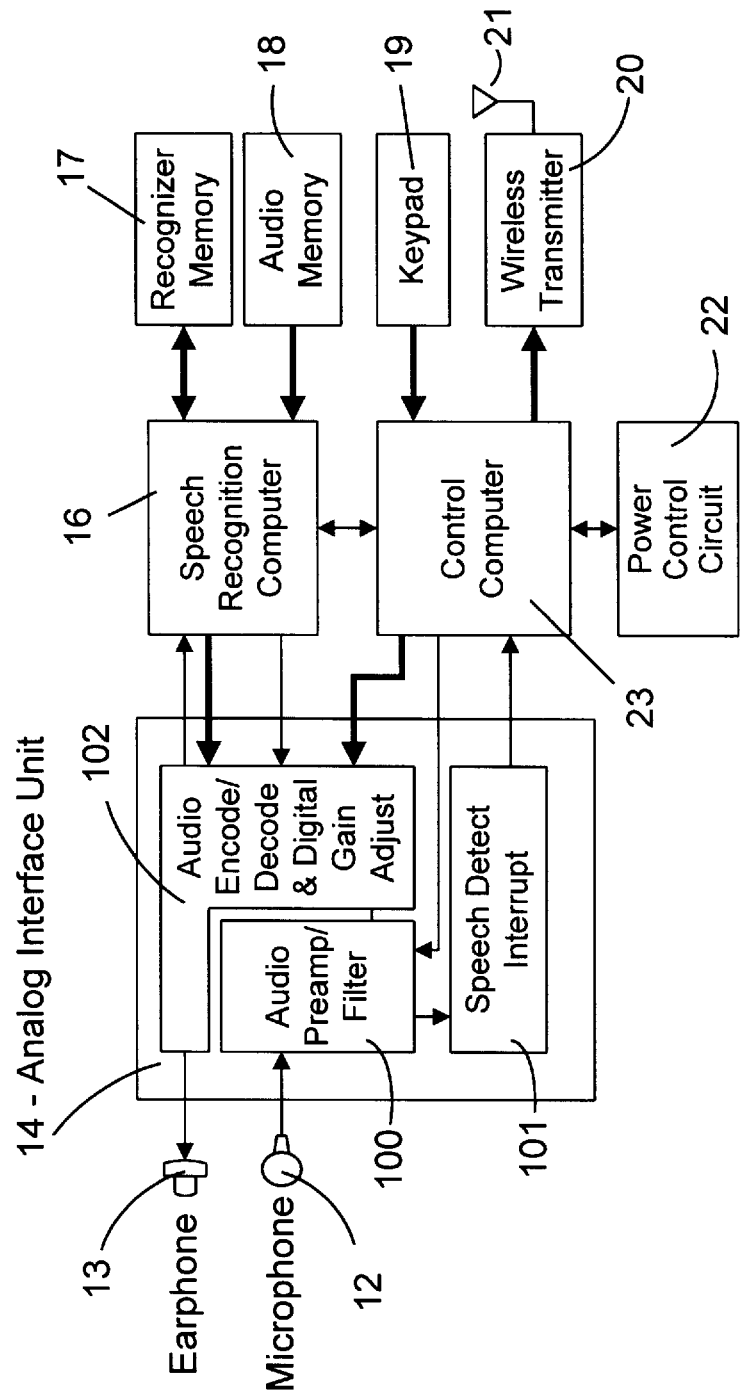
FIG. 3 is a system block diagram for an exemplary remote beltpack printed circuit.

FIG. 3 shows a system block diagram for components mounted upon the beltpack unit printed circuit board 51. The beltpack keypad 19 is scanned by a control computer 23 which interprets key presses and sends appropriate command codes to the wireless transmitter 20. As will be explained further below, the wireless transmitter 20 transmits the command codes to a wireless receiver 25 (shown in FIG. 7) which makes them available to a motor control computer 31 (also shown FIG. 7).

When operating in voice control mode, sound pressure patterns from the operator's voice are received by a microphone 12 which converts them to a voice analog signal. The microphone 12 in one embodiment is a lapel microphone which may be attached to the operators clothing, or to a cord worn around the operators neck. The voice analog signal is input to an analog interface unit 14. Generally speaking, analog interface unit 14 provides an analog interface between microphone 12, earphone 13, speech recognition computer 16, and control computer 23.

For one specific implementation, analog interface unit 14 includes an analog preamp/filter 100 coupled to a speech detect interrupt unit 101 and an audio encode/decode and digital gain adjust circuit 102. These circuits perform a variety of functions including supplying power to the microphone element, adjusting the amplitude and offset of the voice analog signal, filtering out unwanted frequency components of the voice analog signal, detecting when speech is present, and conversion between analog and digital signals. It is specifically contemplated that a variety of additional or alternative circuits may be employed to implement analog interface unit 14.

Figure 4:
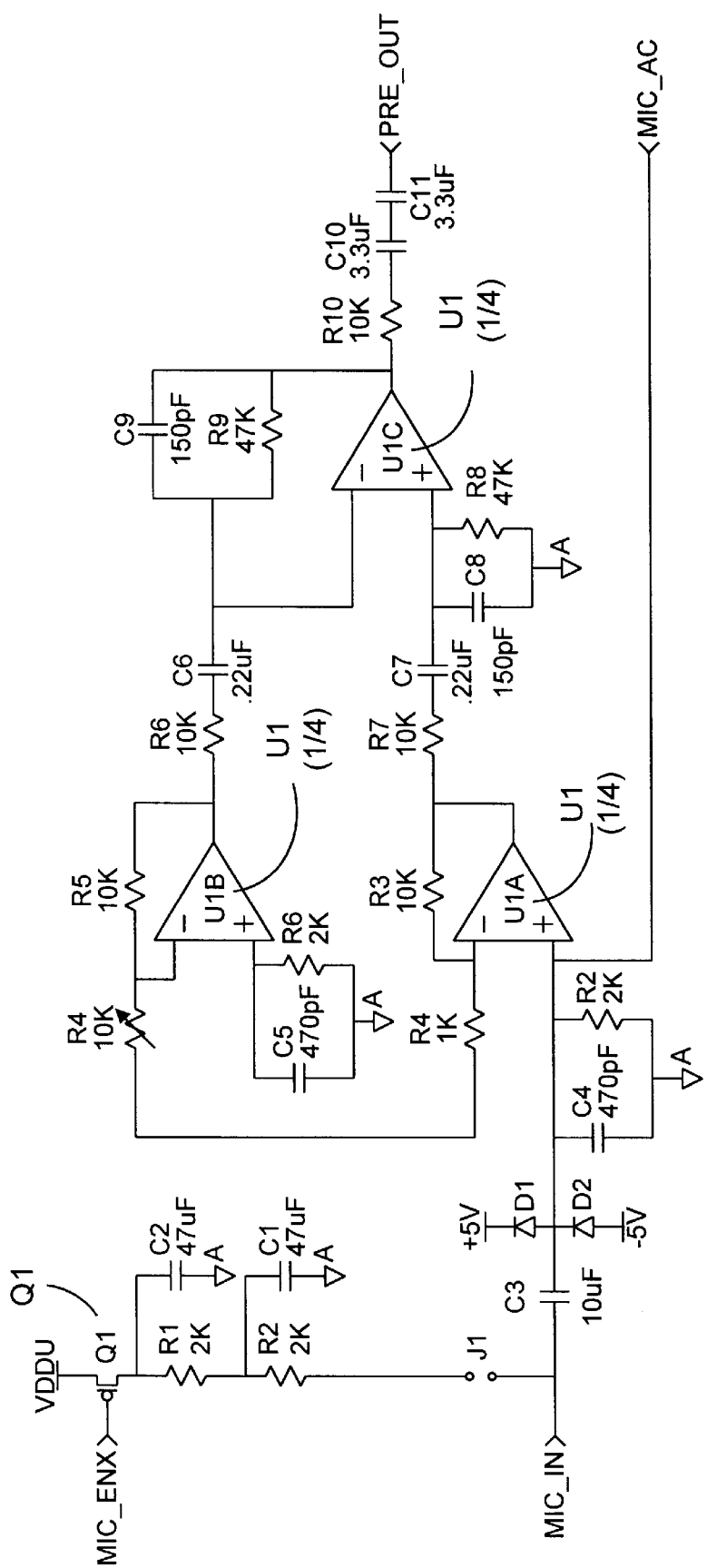
FIG. 4 is an electrical schematic of an audio preamplifier/filter circuit.

FIG. 4 shows one suitable implementation of audio preamplifier/filter circuit 100. The circuit supplies power to the microphone 12 through transistor Q1 and jumper J1. In this implementation, microphone 12 is an electret microphone which requires a bias voltage of approximately 5 volts. Transistor Q1 is a PMOS Field Effect Transistor (FET) which is controlled by the digital signal "MIC_ENX" from the control computer 23. The voice analog signal from the microphone 12 is AC coupled into the preamplifier/filter circuit through series capacitor C3. Diodes D1 and D2 are protection "clamping" diodes which protect the input of amplifier U1A from static discharge which may occur when the microphone is plugged into the circuit. The remainder of the circuit is a three op-amp adjustable-gain differential amplifier with a bandpass filter function. Gain adjustment is performed by changing potentiometer R4. It is noted that it is not necessary to use a differential amplifier design, although this design has been shown to perform well in practice. Also, the circuit may optionally contain a variable filter which may be controlled by control computer 23 to reduce unwanted noise such as wind noise which is associated with operating in an outdoor environment.

Figure 5:
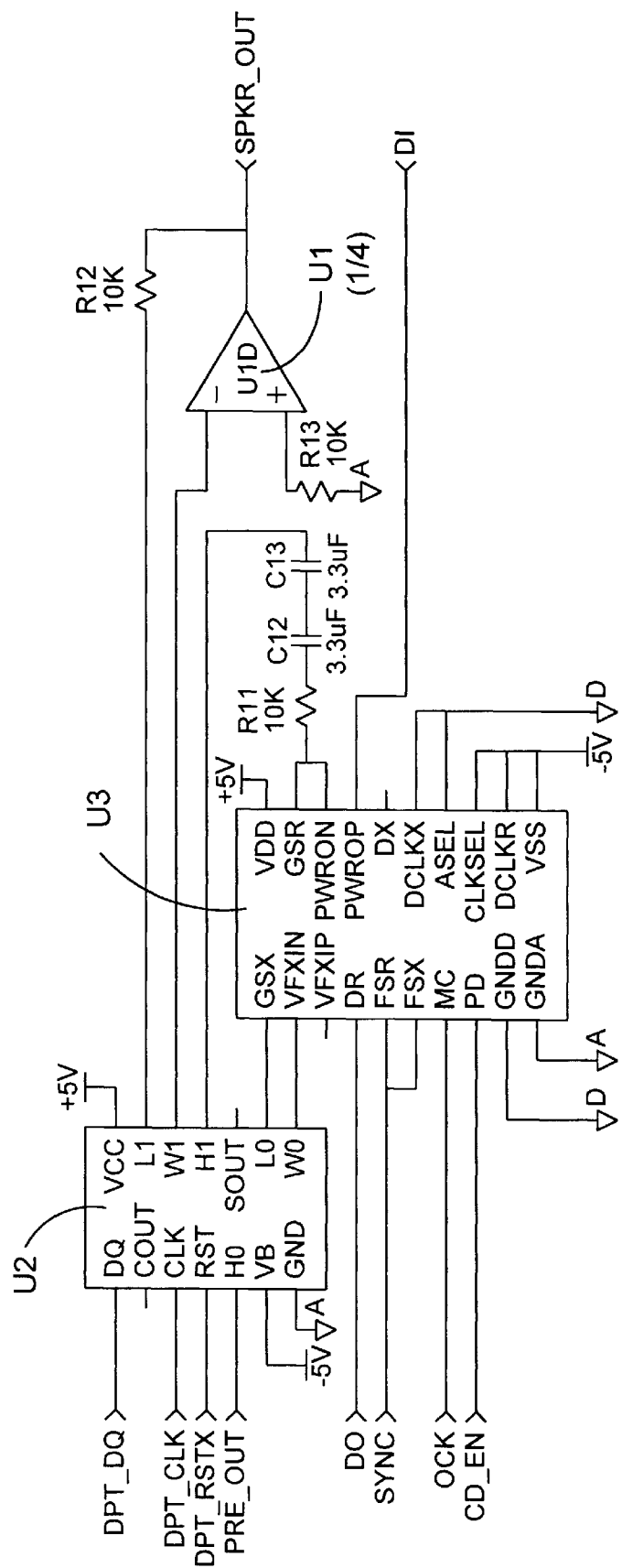
FIG. 5 is an electrical schematic of an audio encode/decode circuit.

FIG. 5 shows one suitable implementation of audio encode/decode circuit 102. The circuit performs final gain adjustment of the input voice analog signal under the control of the control computer 23. A gain adjustment range of 12 dB is provided by a digital potentiometer U2, which in this example is a Dallas Semiconductor DS1267. Other suitable digital potentiometers exist and may be used at the circuit designers discretion. The digital gain adjustment provides a way for the control computer to adjust for changes in the position of the microphone on the operator's clothing or other voice amplitude variations. The audio encode/decode circuit also contains a CODEC U3, which digitizes the amplified and filtered voice analog signal into a serial voice digital signal acceptable to the speech recognition computer 16. The CODEC used in this example is an AT&T T7513B, which is an 8-bit serial companding (u-law) CODEC. It is noted that other CODECs and methods for converting between analog and digital signals are available and may be used at the circuit designers discretion. The CODEC is also used to convert the synthesized voice digital signals from the speech recognition computer 16 into a synthesized voice analog signal which is applied to the earphone 13 for operator feedback. Digital potentiometer U2 contains two separately controllable potentiometers, and is thus also used to control the volume of the synthesized voice at the earphone.

Figure 6:
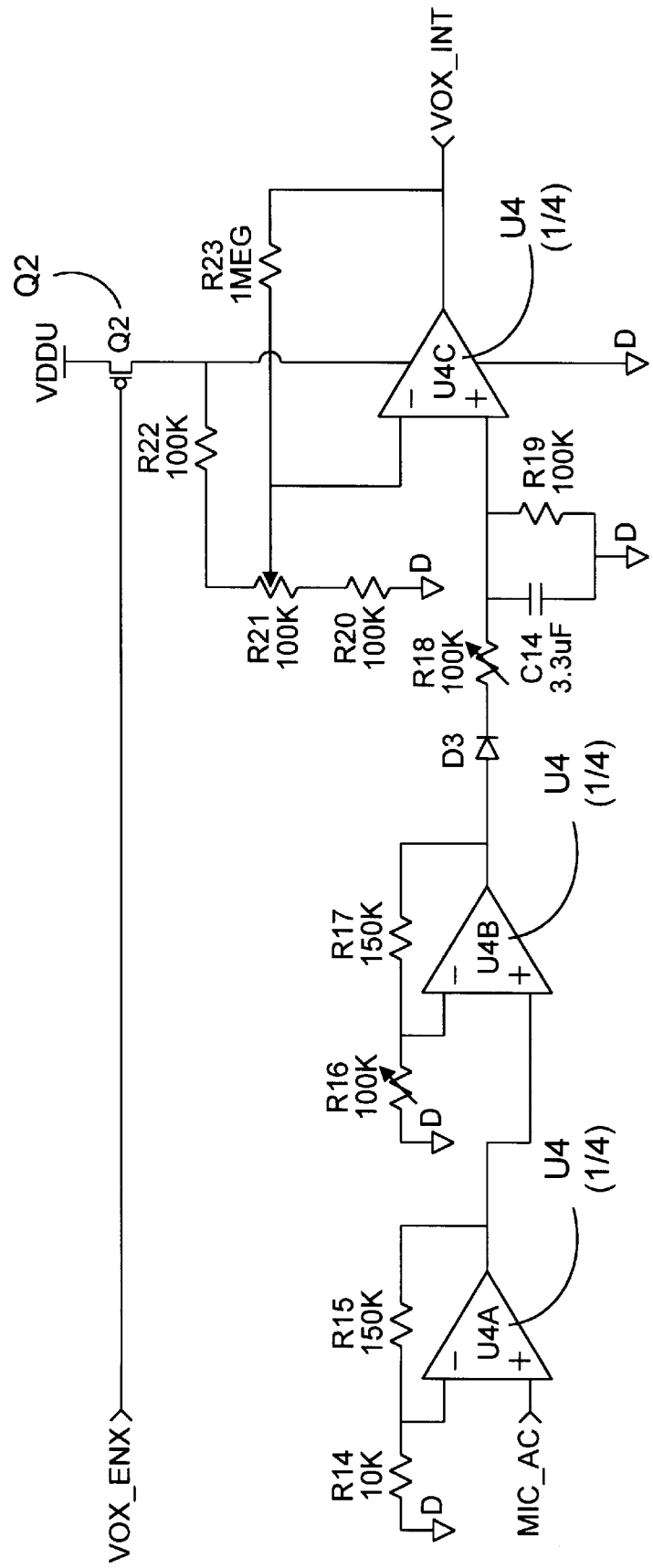
FIG. 6 is an electrical schematic of a speech detect interrupt generation circuit.

FIG. 6 shows one suitable implementation of speech detect interrupt generation circuit 101 which supplies an interrupt to the control computer 23 when speech is detected. A primary use of this circuit is to allow the control computer 23 to shut down unnecessary circuitry when no speech is present, and power up the circuitry when speech is detected. This results in a considerable power savings.

Referring again to FIG. 3, in one embodiment the speech recognition computer 16 examines the voice digital signal from the CODEC (FIG. 5, U3) to determine the starting and ending point of each word said by the operator, and then compares specific parameters calculated from the voice digital signal during the time a word was detected to records stored in the recognizer memory 17. When the parameters calculated from a specific word match one of the records from the recognizer memory closely enough, the speech recognition computer 16 sends a signal to the control computer 23, notifying the control computer 23 which command word was recognized. The control computer 23 then takes the appropriate action which depends on the command word which was recognized Examples of some command words, and their functions are shown in FIG. 8.

The speech recognition computer 16 may include a digital signal processor, a microcontroller, or other appropriate computer which is programmed with speech recognition software. The control computer 23 may include a digital signal processor, a microcontroller, or other appropriate computer which is programmed with appropriate control software. In addition, the speech recognition computer 16 and the control computer 23 may be the same physical unit, with functional partitioning performed in the software programming. Furthermore, many of the functions shown separately in the unit block diagram may be integrated into a single integrated circuit. An example of this type of circuit integration is the OKI Semiconductor MSM6679 which contains a speech recognition computer, recognizer memory, and CODEC on a single silicon chip.

For the embodiment of FIG. 3, the speech recognition software running in the speech recognition computer 16 is speaker dependent, and the command word records stored in the recognizer memory 17 are stored in a separate Random Access Memory (RAM). An example of a suitable speech recognition computer is the AT&T DSP16A Digital Signal Processor. Suitable Speech Recognition software is also available from AT&T. Another example of a suitable speech recognition computer is the OKI Semiconductor MSM6679, which can provide either speaker-dependent, or speaker-independent speech recognition using software provided by Voice Control Systems Inc. As noted above, the use of the MSM6679 provides opportunities for reduction in the number of separate system components since it integrates the recognizer memory, CODEC, and speech recognition processor. A disadvantage to the MSM 6679 is that it is a little slower than the DSP16A which may result in a perceptible lag between when the operator gives a voice command and when the trolling motor responds.

In one embodiment, remote control system beltpack unit 50 may implement a speech audio output function which can be used to communicate with the operator. Error messages and other audio feedback are stored digitally in the audio memory 18. The control computer 23 may command the speech recognition computer 16 to output an audio message by sending a control code with the number of the message which is to be output. When this occurs, the speech recognition computer 16 reads the digitized audio message out of the audio memory 18 and converts it into a stream of digital words which are sent to the analog interface circuit 14. The analog interface circuit 14 converts the digital words into an electrical analog signal which is amplified, filtered, and sent to a speaker 13 which converts the electrical analog signal into a sound pressure signal which the operator can hear. The speaker in one embodiment is a small earphone 13 which is inserted directly into the operators ear.

The power control circuit 22 is configured to selectively power down portions of the remote beltpack circuitry under the control of the control computer 23. For example, when the unit is not in voice control mode, the speech recognition computer 16, recognizer memory 17, and analog interface unit 14 may be powered down resulting in a considerable power savings and extended battery life. In addition, the control computer 23 may be placed in a low-power "stop" condition while waiting for a keypress. This feature can be activated by the software in the control computer 23.

Figure 7:
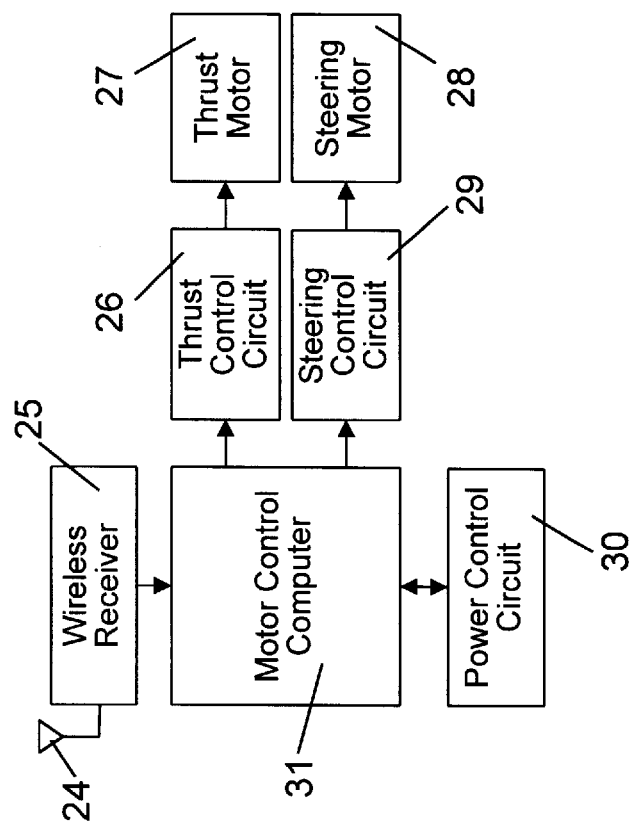
FIG. 7 is a system block diagram of an exemplary trolling motor control circuit.

FIG. 7 shows a system block diagram for an embodiment of the trolling motor control circuit 11b. An antenna 24 and wireless receiver 25 are connected to a motor control computer 31. The antenna 24 and wireless receiver 25 receive control commands transmitted from remote beltpack unit 50 which may be carried by the operator or attached to the operator's belt. The motor control computer 31 may be implemented using a Motorola Inc. MC68HC05 microcontroller or the Microchip Technology Inc. PIC16C55 microcontroller or other suitable microprocessor. In this embodiment, the motor control computer 31 controls a thrust control circuit 26 which adjusts the speed of the thrust motor 1b by pulse width modulation of the voltage attached to the terminals of the thrust motor 1b. The motor control computer 31 also controls a steering control circuit 29 which adjusts the polarity and voltage applied to the terminals of the electric steering motor 11a, thereby causing the submerged housing unit 1a to rotate in the desired direction, or maintain direction. Additionally, the motor control computer 31 may control a power control circuit 30 which can selectively power down portions of the trolling motor control circuit 11b to save power when the unit is not in use.

FIG. 8 shows a sample list of commands which can be used by the operator to remotely control the trolling motor by voice command. Careful selection of voice commands is important for best voice recognizer performance, and for ease of use. It is important that the voice command set include words that do not sound alike to the voice recognizer, and it is equally important that they are reasonably intuitive to the operator. In one embodiment, the voice command "LEFT" causes the trolling motor to turn left 22.5 degrees when viewed by an operator who is standing facing forward in the boat. The voice command "RIGHT" causes the trolling motor to turn right 22.5 degrees. The voice commands "HARD LEFT" and "HARD RIGHT" cause the trolling motor to turn 90 degrees to the left or right respectively. "HARD LEFT" and "HARD RIGHT" are useful for turning the boat around, or for avoiding obstacles, or for turning the boat away from the bank when a fish is hooked while trolling parallel to the bank.

The voice commands "REVERSE" and "FORWARD" cause the trolling motor to turn 180 degrees to the left or right respectively. The purpose of these commands is to reverse the thrust direction of the trolling motor. It is also possible to reverse the rotation of the propeller to achieve the same effect, however this may not be advisable due to the design of the propeller, and subsequent cavitation noise. Commands which affect the speed of the thrust motor are "STOP", "ONE", "TWO", "THREE", "FOUR", "FASTER", and "SLOWER". In one embodiment, the thrust control circuit 26 is capable of fifteen individual speed settings in addition to stopped. The voice command "STOP" causes the thrust motor to stop, while the voice command "FOUR" or "MAX" causes the thrust motor to set to speed fifteen (highest). The voice commands "ONE", "TWO", and "THREE" cause the speed to be set to one-quarter, one-half, and three-quarter speed respectively. The voice commands "FASTER" and "SLOWER" cause the current speed setting to be incremented or decremented by one setting. This results in an acceptable tradeoff between fine control of speed, and large numbers of voice commands.

The voice commands "THRUST" and "NO THRUST" cause the thrust motor to start or stop respectively. When a "THRUST" command is voiced after a previous "NO THRUST" command, the thrust motor restarts at the speed at which it was operating when the "NO THRUST" command was detected. The voice command "VOICE OFF" is used to cause the remote control unit to stop processing voice commands This command may be used when the operator wishes to carry on a conversation with another boat passenger without the risk of unintended remote control operation. Once a "VOICE OFF" command has been recognized, the operator must use the "VOICE REC" key to restart voice command mode.

It is noted that while the list of voice commands as illustrated in FIG. 8 are believed to work well, other or alternative voice commands are contemplated in other embodiments.

Figure 9:
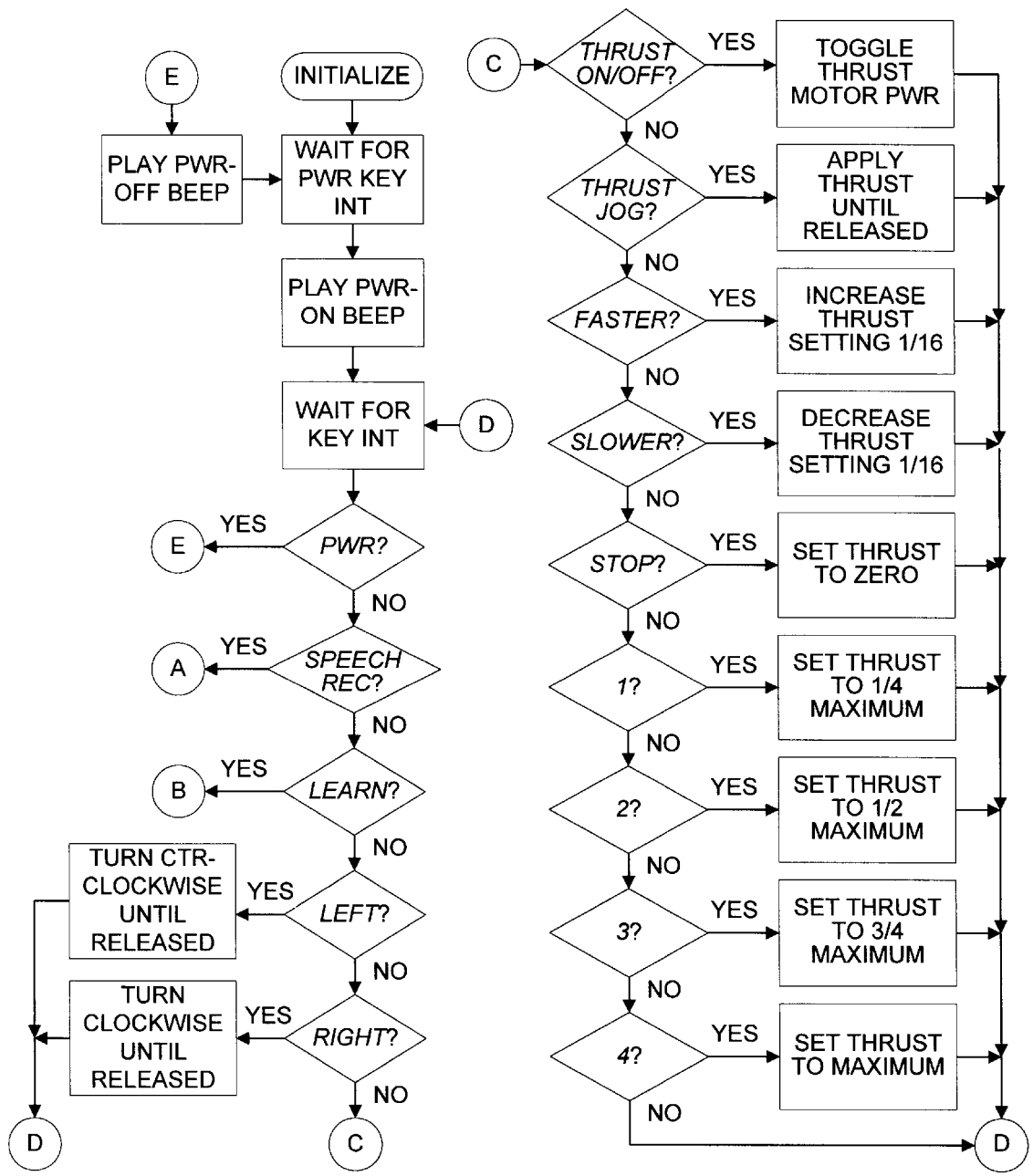
FIG. 9 is a flow diagram illustrating operation of the speaker dependent beltpack unit in "Key only" mode.

FIG. 9 shows one implementation of software flow for the speaker-dependent embodiment described above. After the insertion of batteries into the remote beltpack unit 50, or when the beltpack unit has been reset, the system starts at the Initialize block in the upper left-hand corner of FIG. 9. When the PWR key 35 is pressed, the system alerts the operator that the power has been turned on through an audible beep, or visual indication (LED), and waits for another key to be pressed. This condition is referred to as a "Key Only" mode, because the speech recognition is not enabled. Motor control keys such as LEFT 37, RIGHT 38, etc. are handled directly by the control program. Pressing VOICE REC 36a or LEARN 36b places the unit in "Voice Mode" or "Learn Mode" respectively. Voice Mode enables the use of voice commands to control the trolling motor, while Learn Mode allows the speaker-dependent training of individual voice commands.

Figure 10:
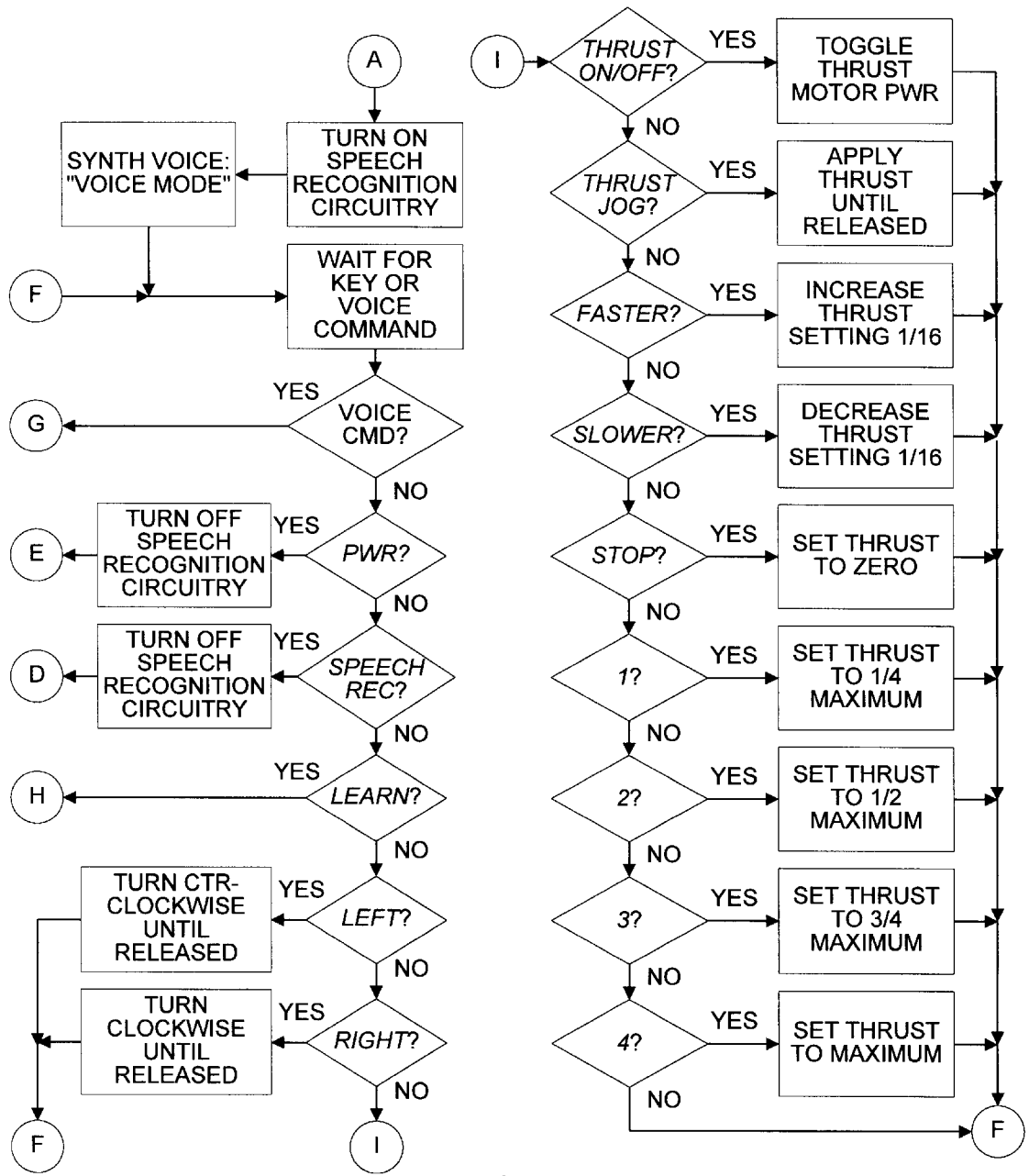
FIG. 10 is a flow diagram illustrating operation of the speaker dependent beltpack unit in "Voice" mode.
Figure 11:
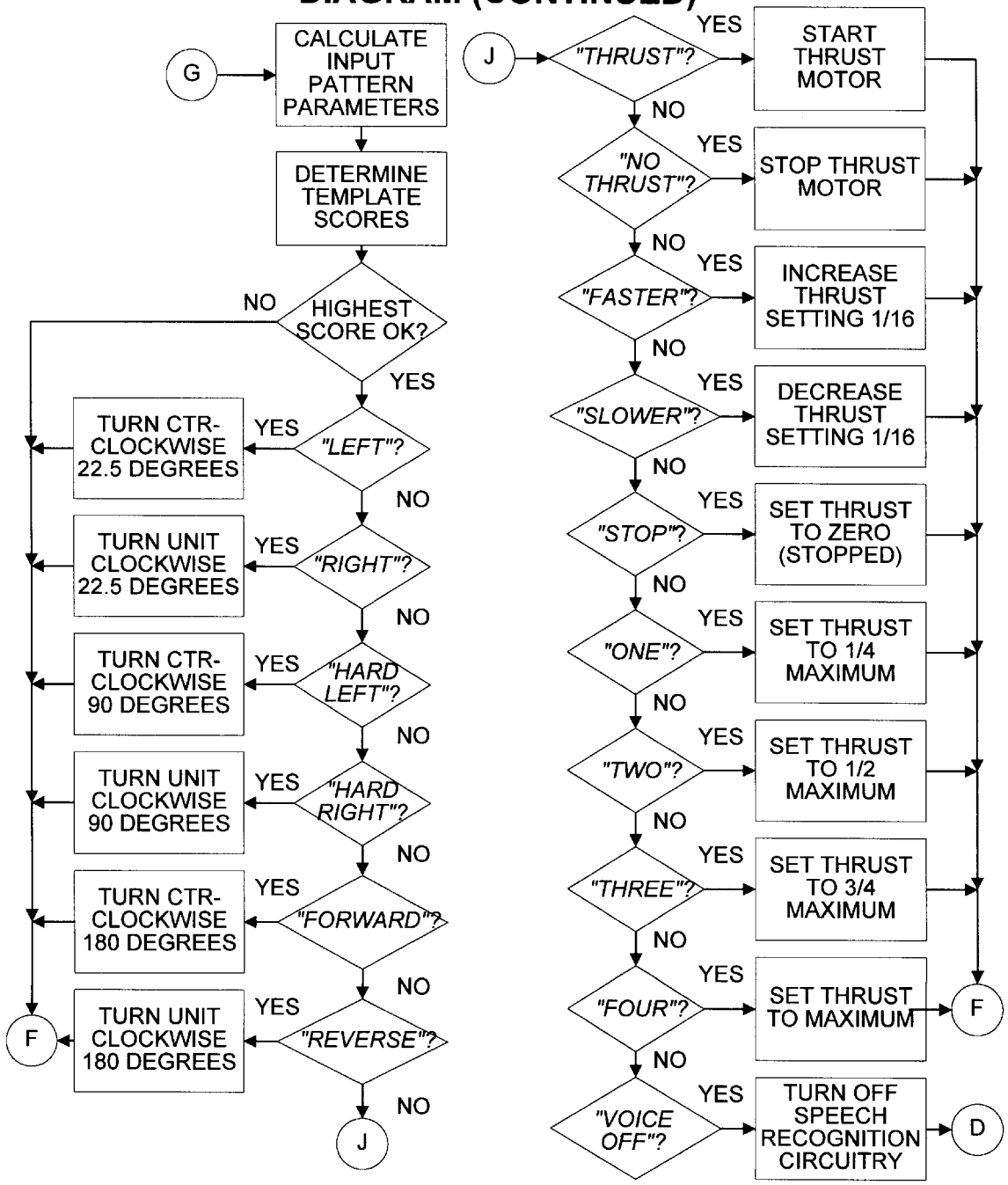
FIG. 11 is a flow diagram illustrating operation of the speaker dependent beltpack unit in "Voice" mode.

FIG. 10 is a flow diagram which illustrates exemplary functions of the beltpack unit system software in Voice Mode. When the operator presses the VOICE REC key 36a while in Key Only mode, the unit enters Voice Mode, and an audible indication is made to the operator such as a synthesized voice saying "Voice Mode". This indication could also be a special audible beep, or a visual indication such as an LED. Once in Voice Mode, the motor control keys continue to function as in Key Only mode, however the speech recognition is enabled, and the unit will also respond to voice commands. FIG. 11 shows the software flow which handles voice commands when they are recognized. Learn Mode can be entered from Voice Mode by pressing the LEARN key 36b, and the speech recognition can be disabled by pressing the VOICE REC key 36a a second time.

Figure 12:
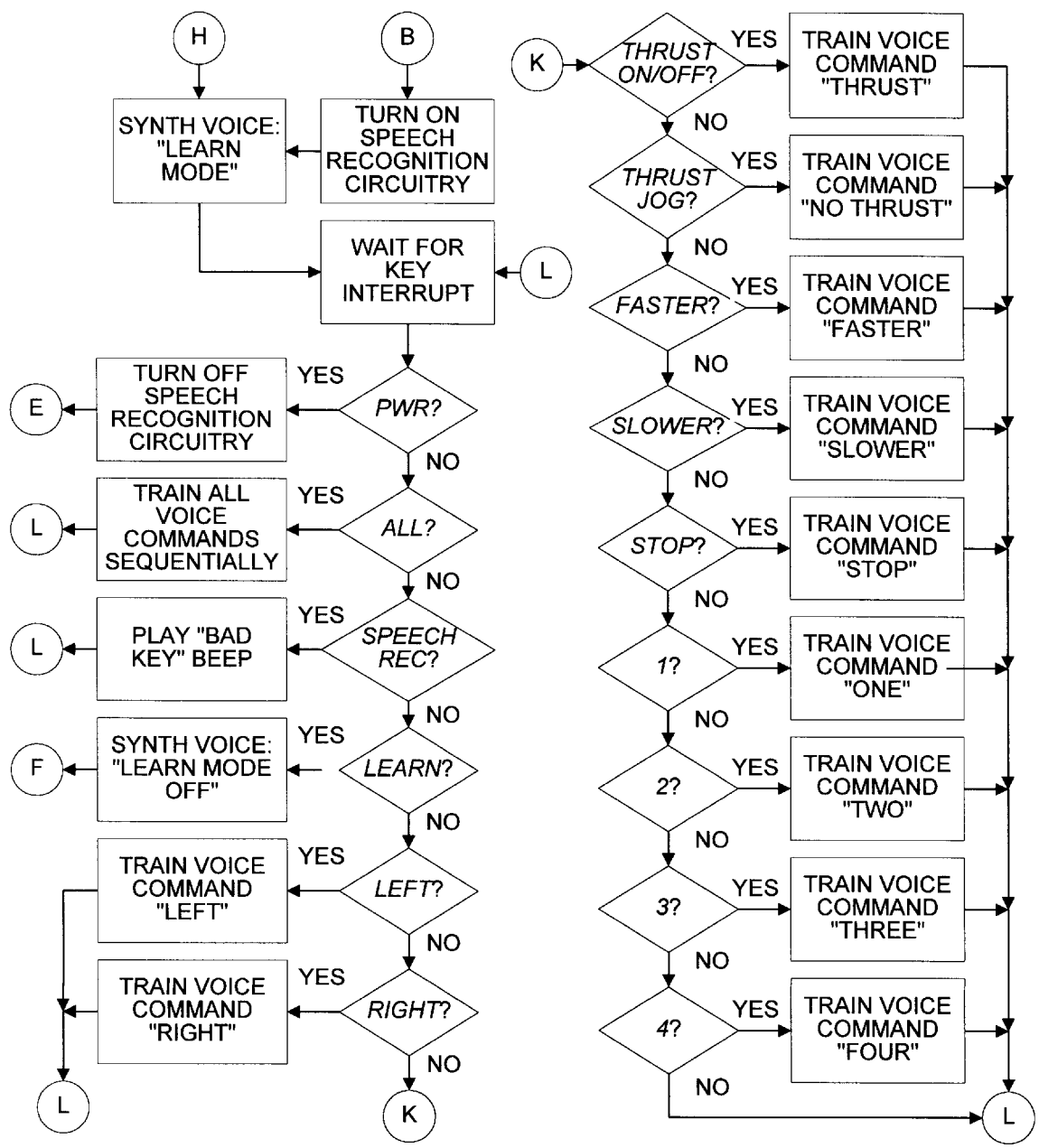
FIG. 12 is a flow diagram illustrating command training in "Learn" mode.
Figure 13A:
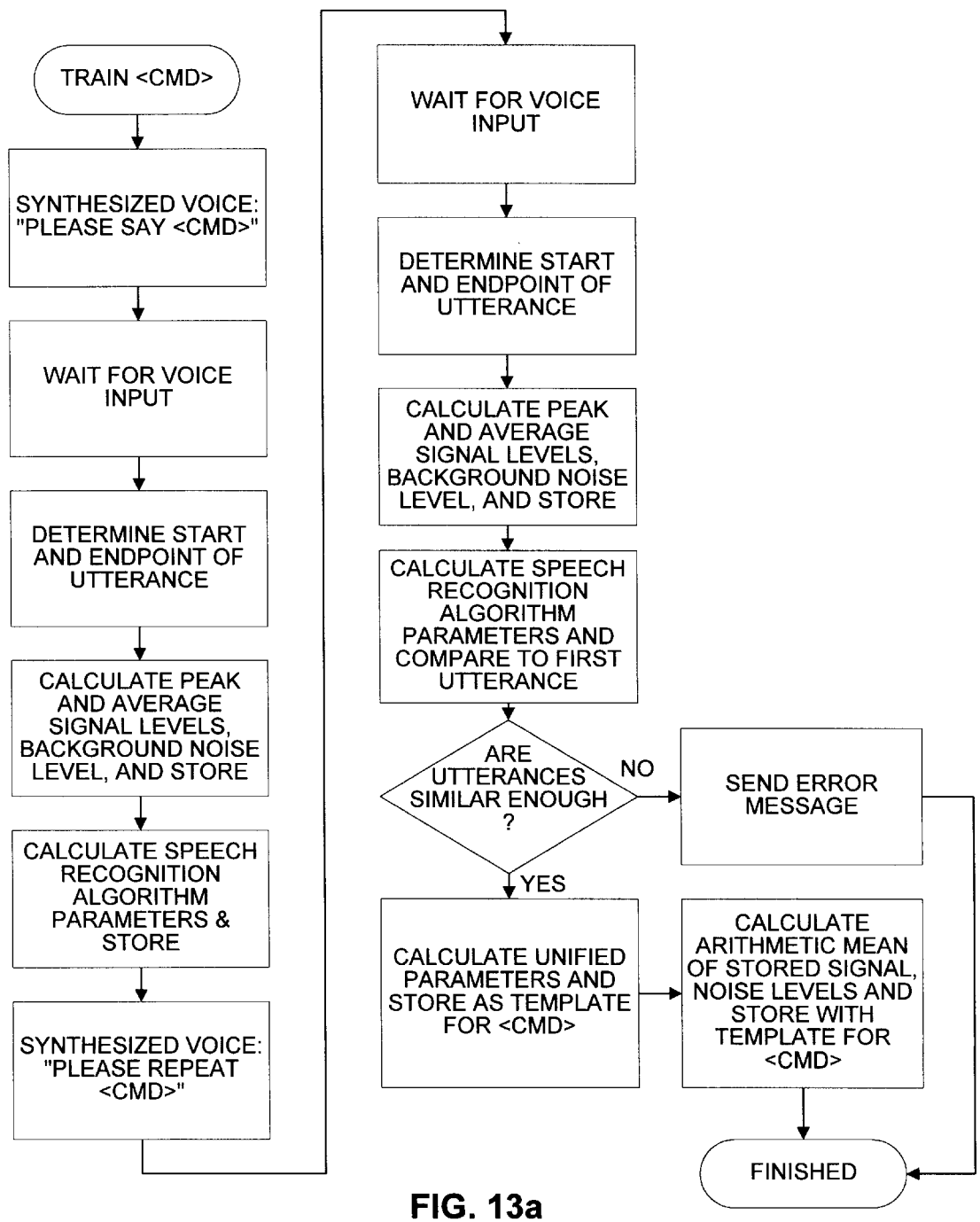
FIG. 13a is a flow diagram illustrating individual command training.
Figure 13B:
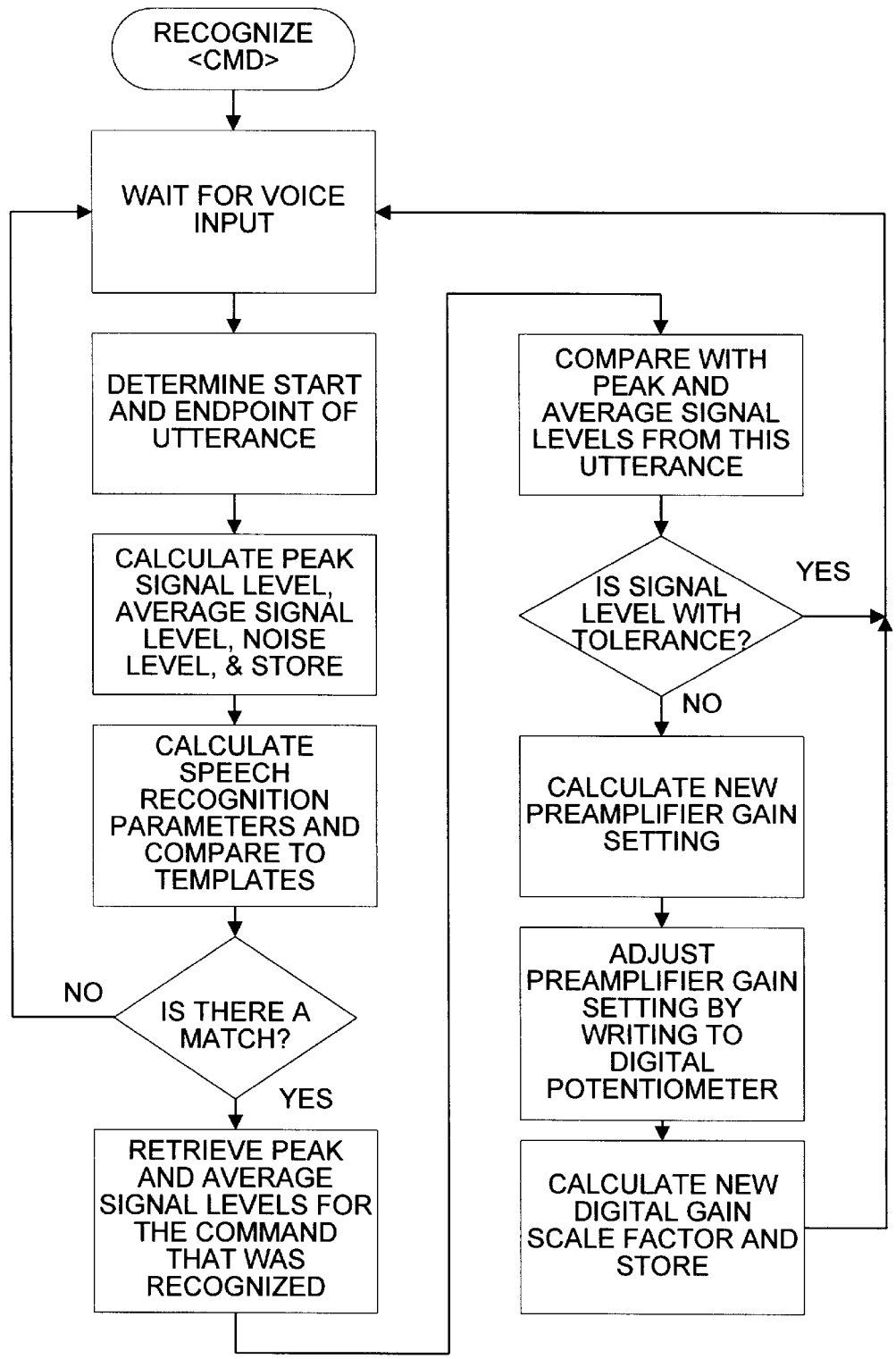
FIG. 13b is a flow diagram illustrating software gain control.
Figure 14:
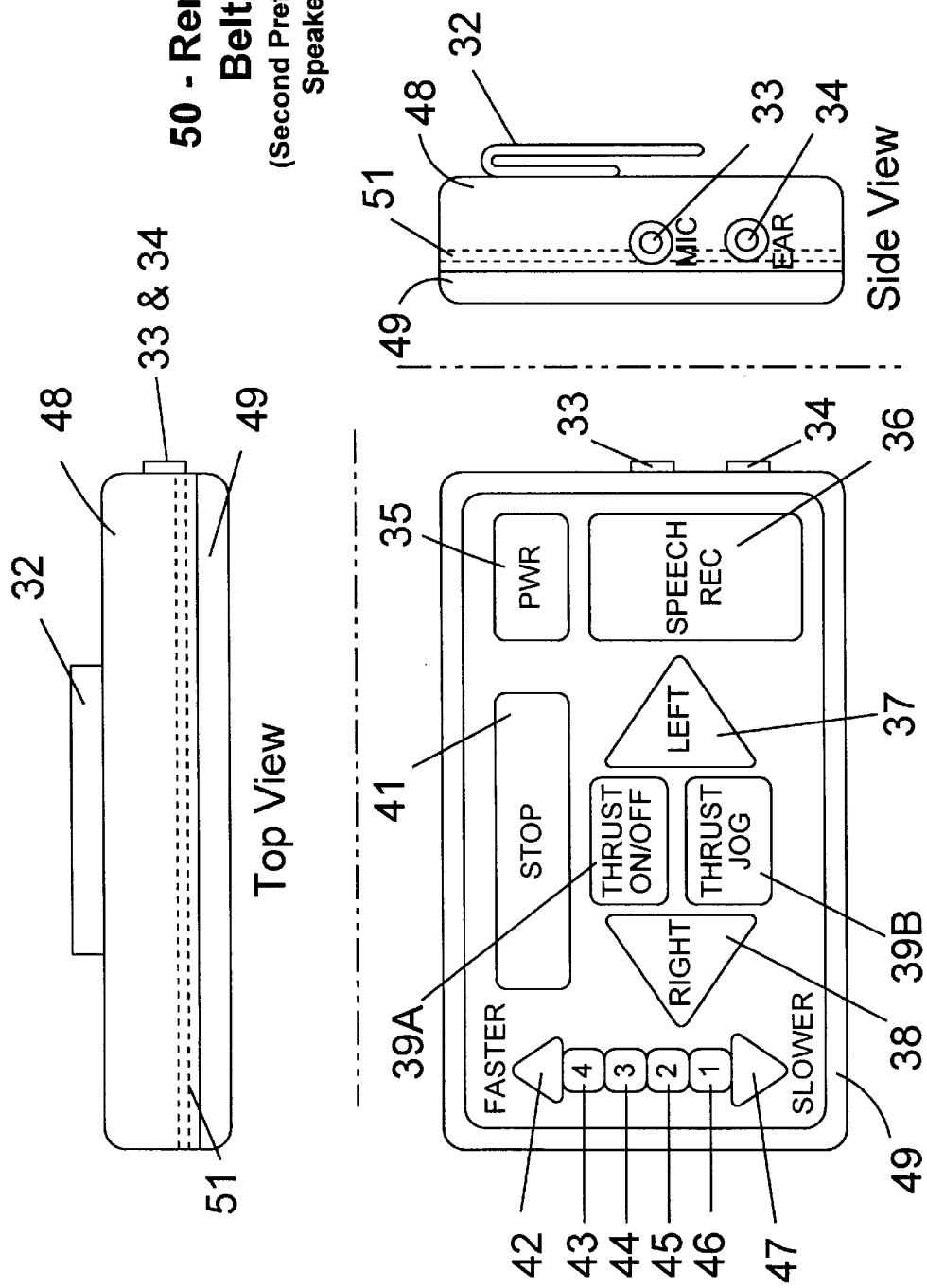
FIG. 14 is a drawing of an exemplary speaker independent beltpack unit.

FIG. 12 is a flow diagram which illustrates exemplary functions of the beltpack unit system software in Learn Mode. The operator can train individual voice commands by pressing motor control keys to indicate which command to train. In Learn Mode, the motor control keys only function to select commands to train, and keyboard control of the trolling motor is disabled. Pressing the ALL key 36c causes the beltpack unit to train all of the voice commands sequentially. FIG. 13a shows the training sequence for an individual command The unit first prompts the operator to say the command by playing the synthesized voice sequence "Please Say <cmd>" where <cmd> is replaced by the synthesized sequence for the voice command which is being trained. Once the operator has responded, the speech recognition computer 16 determines the start and endpoint of the utterance and calculates the peak signal level (in dB), average signal level (in dB), and background noise level (in dB). It then calculates specific parameters used by the speech recognition software, and prompts the operator to repeat the command by playing the synthesized voice sequence "Please Repeat <cmd>". When the operator responds, the speech recognition computer 16 once again determines the start and endpoint of the utterance, and calculates the signal levels, and speech recognition parameters. It then compares the parameters with the parameters calculated from the first utterance, and determines if the two utterances are similar enough to use. If the two utterances are not similar enough, the system issues an error message to the operator. However, if the utterances are similar enough, the speech recognition computer 16 combines the parameters from the two utterances to form a single command record used for recognizing that particular voice command. The peak signal level, average signal level, and background noise level are stored in a memory location of recognizer memory 17 which is associated with the particular command which was trained. These levels are used during voice command recognition to enable the use of a software controlled gain function which compensates for variation in microphone placement, wind noise, the volume of the operators voice, etc. An exemplary software flow diagram for the software controlled gain function is shown in FIG. 13b. It is noted that other training methodologies may be used with the remote control system at the system designers discretion.

FIG. 13b illustrates an exemplary software flow during recognition of a voice command, and particularly an exemplary software gain control function for the audio encode/decode block (FIG. 5). When a voice command is detected, the speech recognition computer 16 first determines the start and endpoints of the utterance, and then calculates a peak and average signal level in dB. The speech recognition parameters are then calculated and compared individually to each of the command records previously stored in the recognizer memory 17. The speech recognition parameters calculated and the method of comparison will depend on the speech recognition algorithm used, and may involve dynamic time warping and/or Markov Models etc. If none of the command records matches the utterance closely enough, the command is ignored. However, if there is a match, the speech recognition computer 16 communicates with the control computer 23, identifying which command has been recognized, and passing the peak and average signal levels from the utterance, and the peak and average signal levels stored with the command record. The control computer 23 performs the command function indicated by the voice command, and then compares the peak and average signal levels from the utterance and command record. If the peak and average signal levels from the command record and the utterance match closely enough (within one or two dB), there is no further action. However, if the signal level difference is more significant, the control computer 26 calculates a new gain setting. The control computer 26 then adjusts the preamplifier gain setting by writing a new value to the digital potentiometer U2. In addition, the control computer may adjust a digital scale factor which is used to scale the digital input to the speech recognition computer 16. The exemplary software gain control function as illustrated in FIG. 13b is equally useful in speaker-independent, and speaker adaptive embodiments as discussed below.

Figure 15:
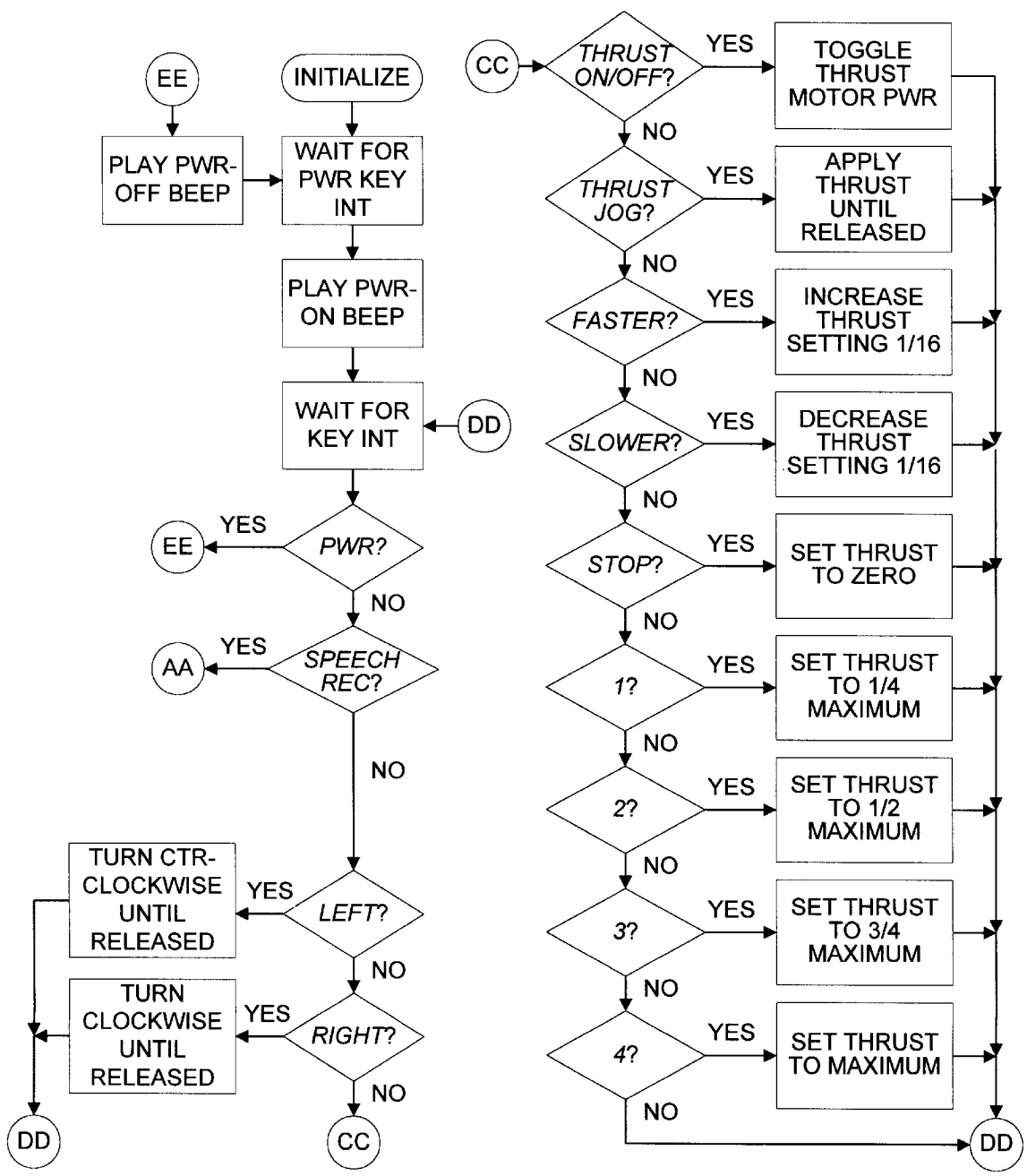
FIG. 15 is a flow diagram illustrating operation of the speaker independent beltpack unit in "Key only" mode.
Figure 16:
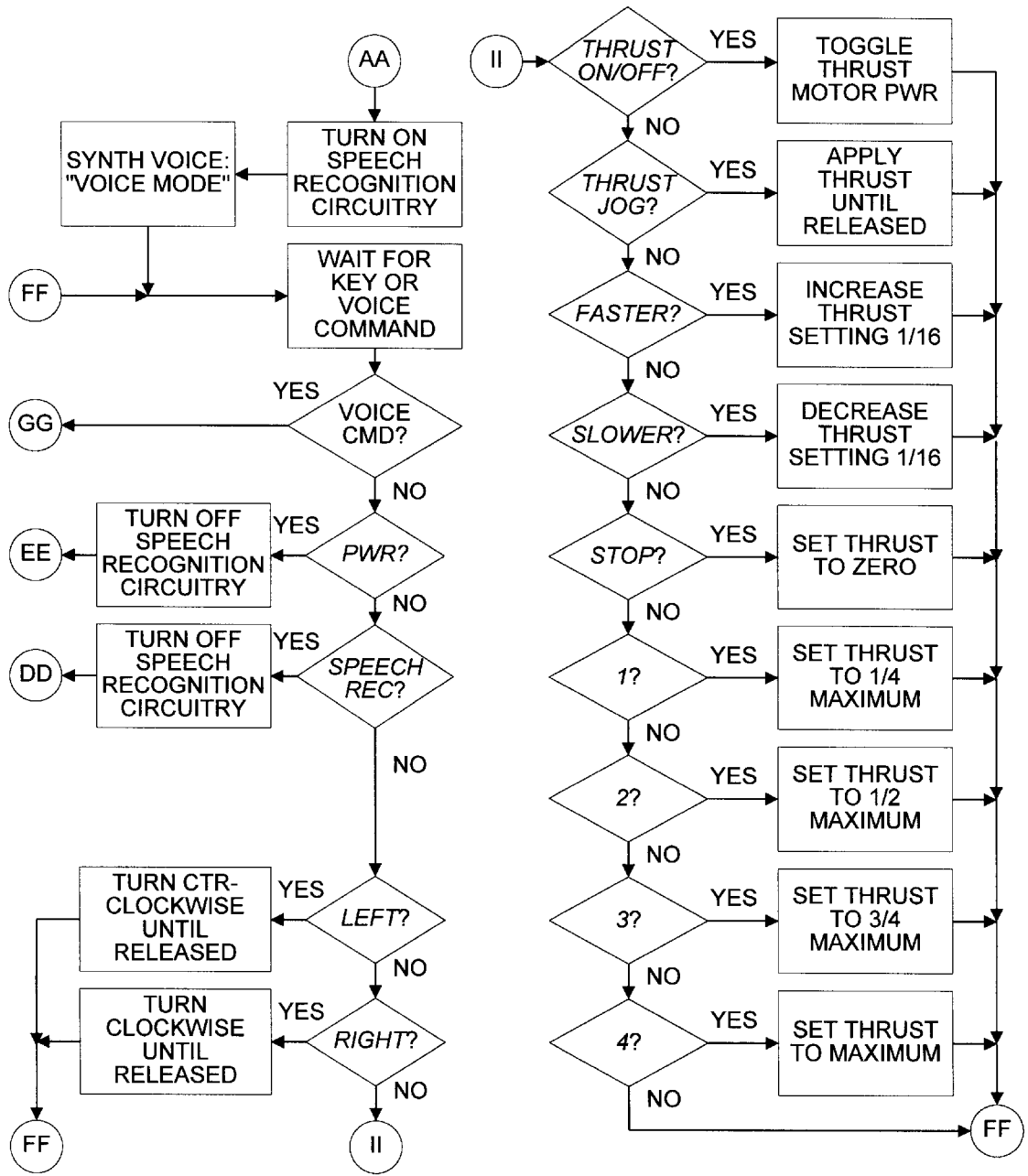
FIG. 16 is a flow diagram showing key actions in "Voice" mode.
Figure 17:
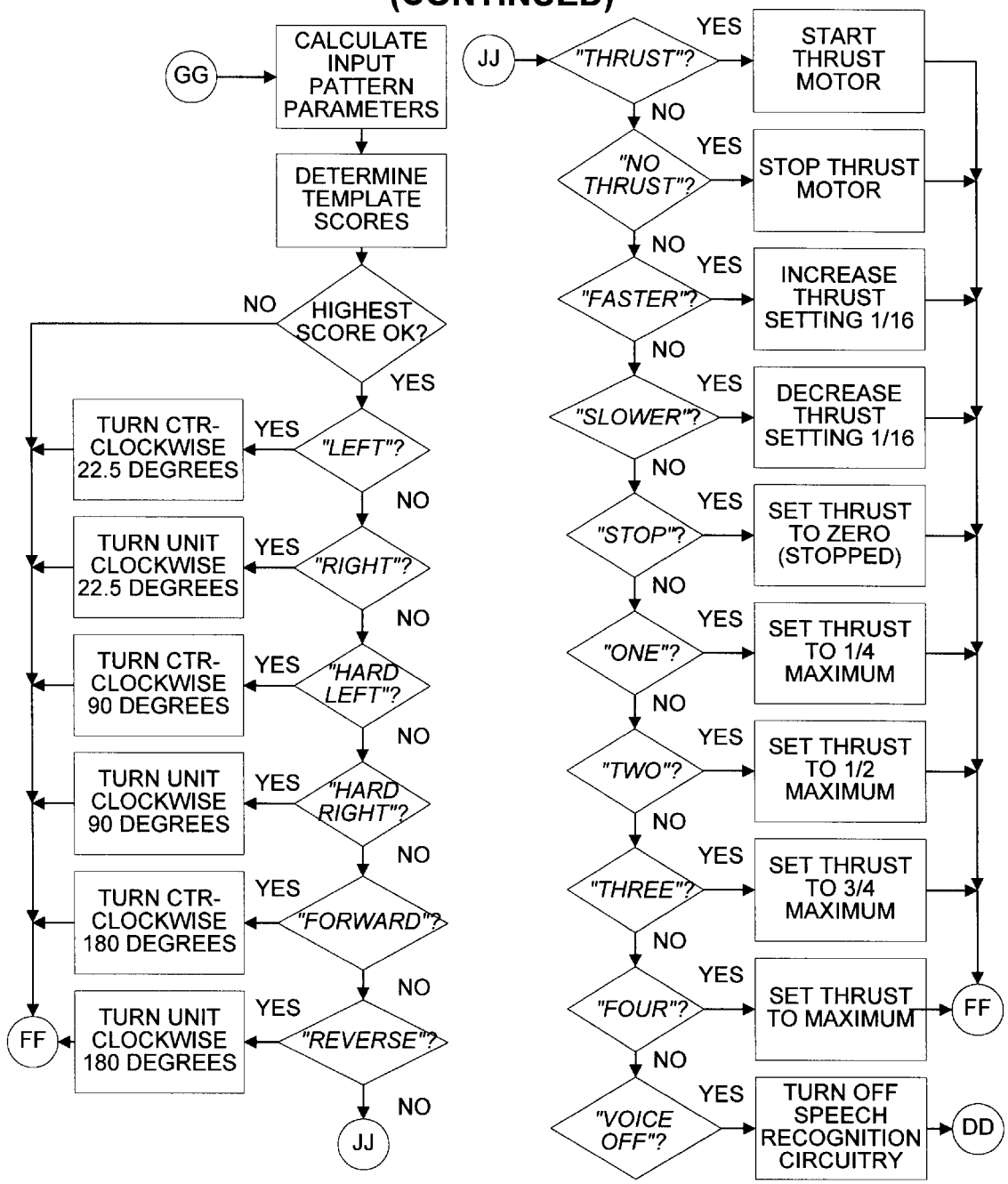
FIG. 17 is a flow diagram for showing voice commands in "Voice" mode.

FIGS. 14–17 illustrate another embodiment of a voice controlled trolling motor system which employs a speaker-independent speech recognition algorithm such as that of the OKI MSM6679 speech recognition processor. Speaker-independent speech recognition command records are derived from several hundred utterances of a particular voice command, all by different speakers, and are typically stored in read-only memory (ROM) instead of random access memory (RAM). The primary differences in the outward appearance of the remote beltpack unit 50 for this embodiment are the removal of the LEARN key (36b FIG. 2) and ALL key (36c FIG. 2). Exemplary software flow diagrams for the speaker independent embodiment of FIGS. 14–17 are shown in FIGS. 15–17, and are identical to those of the previous embodiment, with the exception that the Learn Mode has been removed. Speaker-independence can be more convenient for the operator since it does not recognize training of voice commands. However, this convenience may be at the cost of reduced reliability for certain operators, and in addition, the operator cannot retrain an individual command if there is one command with which he/she is having difficulty.

Yet another embodiment incorporates a speaker-adaptive speech recognition algorithm. In such an embodiment, the speech recognition command records have been derived from the utterances of hundreds of different speakers similar to the embodiment of FIGS. 14–17. However, the Learn Mode functions are retained, and a particular voice command may be re-trained by the operator similar to the first embodiment. In addition, as the unit is used, the speech recognition algorithm may update the speech recognition command records for individual voice commands as needed to assure maximum performance by the speech recognition algorithm.

Figure 18:
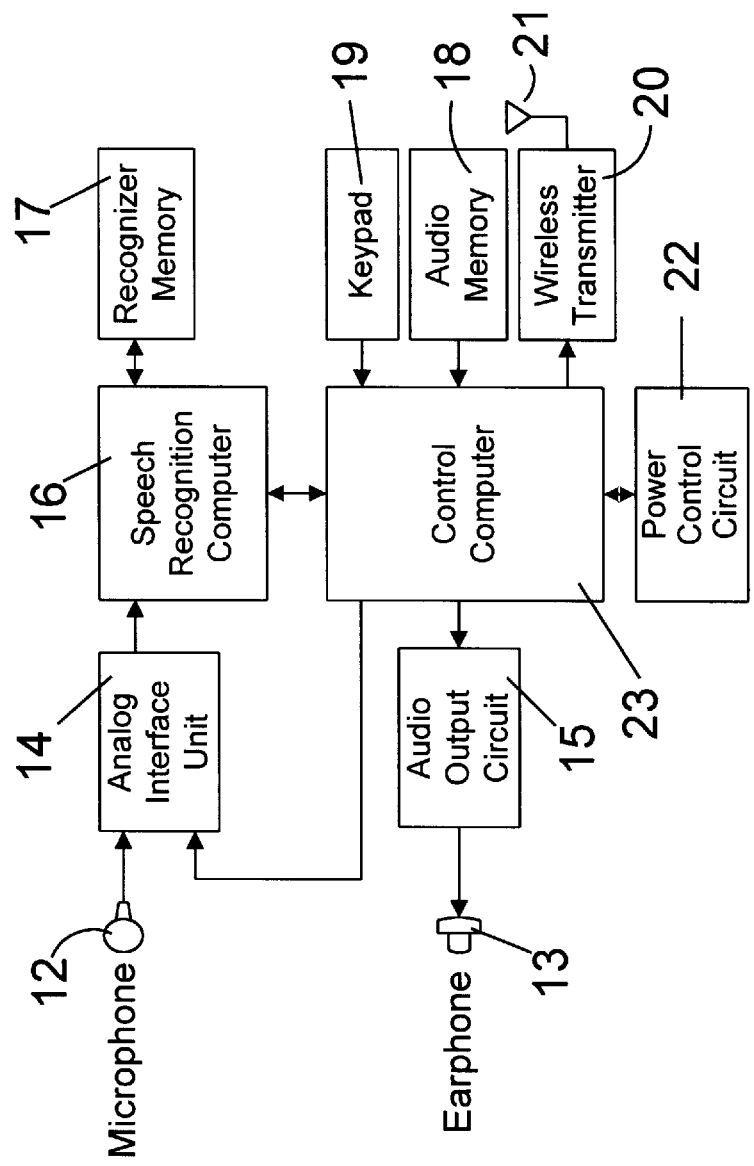
FIG. 18 is a block diagram of an exemplary beltpack unit wherein the audio output is provided from a control computer via an audio output circuit.

Turning next to FIG. 18, a block diagram of another embodiment of a remote beltpack unit printed circuit board 51 is shown. Circuit portions that correspond to those of FIG. 3 are numbered identically for simplicity and clarity. In this embodiment, the control computer 23 controls an audio output circuit 15 directly. The control computer 23 reads digitized voice from an audio memory 18 and outputs it to the audio output circuit 14 in order to produce the synthesized speech passages or audio sounds used for operator feedback. Audio output circuit 15 may convert digital voice signals to analog voice signals, and may amplify the audio voice signals for conveyance to earphone 13.

Figure 19:
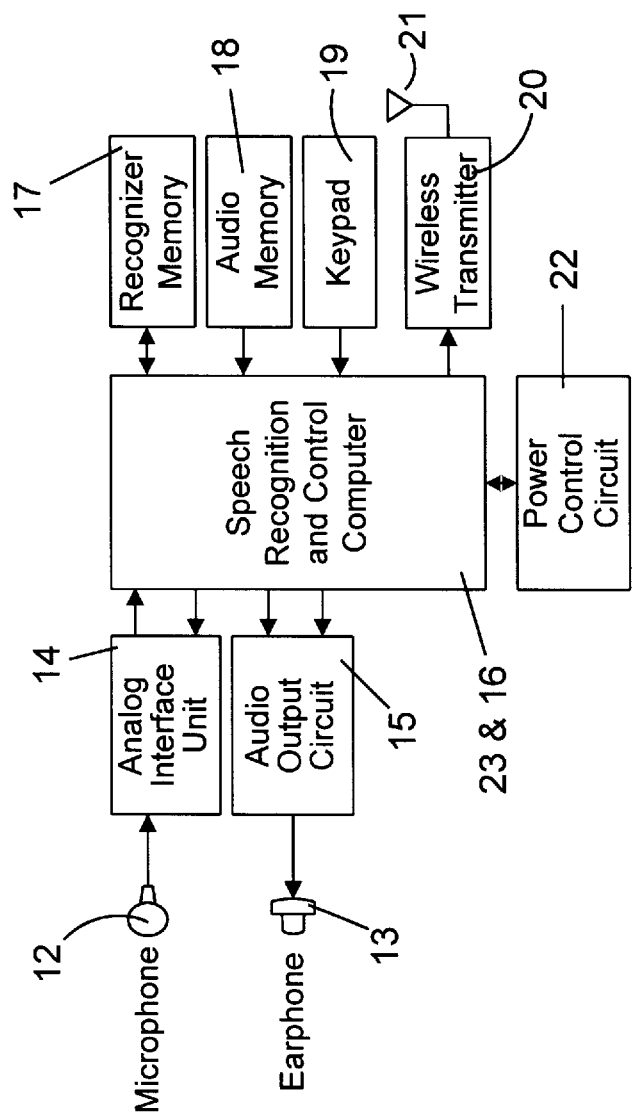
FIG. 19 is a block diagram of an exemplary beltpack unit wherein the speech recognition functionality is performed by a control computer.

FIG. 19 shows an embodiment that includes a remote beltpack unit printed circuit board 51 where the control computer 23 and the speech recognition computer 16 are implemented using the same physical microcontroller. In addition, it is possible to integrate the recognizer memory 17 and audio memory 18 along with the combined voice recognition/control computer 23,16 to form a highly integrated unit. The OKI MSM6679 is an example of this type of integration. The MSM6679 also performs certain analog interface functions performed by analog interface circuit 14 and audio output circuit 15, resulting in a significant savings on printed circuit board real estate. However, as previously noted, the MSM6679 also has some performance drawbacks which may adversely affect overall system performance. It is noted that the particular speech recognition computer or voice recognition algorithm may be varied from the embodiments described above.

Still another embodiment of a voice controlled trolling motor system incorporates all of the electronics circuitry into a single printed circuit board mounted inside the trolling motor upper housing 9 (FIG. 1). In such an embodiment, a microphone and acoustic speaker are mounted inside the trolling motor upper housing 9, and are acoustically coupled to the outside of the housing. The operator controls the trolling motor by speaking voice commands in the general direction of the trolling motor. An advantage of this embodiment is that there is no external remote control necessary, resulting in a possible cost savings. In addition, the speech recognition and control processors 16 and 32 can be powered by the large batteries which power the trolling motor itself, instead of the batteries in a remote beltpack unit. Software speech recognition algorithms which may accommodate the large dynamic range input signal associated with recognizing speech from a varying distance are available from Voice Control Systems (Dallas Tex.), as well as other vendors.

In yet another embodiment, rather than incorporating the speech recognition circuitry within a remote unit (e.g., with remote beltpack unit 50), the voice recognition circuitry is incorporated within the trolling motor upper housing 9, while a remote unit is utilized to receive voice commands of the user and to convey the voice commands via a wireless transmission. Such an embodiment may include a remote unit having keys similar to those of the beltpack unit of FIGS. 2 and 14 and that function similarly. Instead of performing local speech recognition within the beltpack, the remote unit. may utilize an RF (radio frequency) transceiver with a full-duplex audio channel to communicate with the printed circuit board in the trolling motor upper housing 9. Voice commands picked up by the operator's microphone 12 are sent directly via radio frequency transmission to the printed circuit board in the trolling motor upper housing 9, where the voice commands are recognized and performed. In addition, key presses are encoded and sent over the same RF channel. Audio feedback for the user is sent back via an RF channel to the beltpack unit where it is transmitted to the operators earphone 13. An advantage of this embodiment is that it reduces the amount of circuitry incorporated in the remote beltpack unit 50, and consequently the power drain on the batteries.

The above described embodiments are intended to illustrate a variety of possible implementations of the invention, and not by way of limitation. Other possible configurations will be apparent to one skilled in the art.

We claim:

1. A control system for a trolling motor comprising:
  a remote unit for receiving voice commands of a user, wherein said remote unit is configured to convert said voice commands to electrical signals and to convey said electrical signals via a wireless transmission, wherein said remote unit includes a speech recognition computer and an analog interface unit coupled to said voice recognition computer, wherein said analog interface unit is configured to convert analog voice command signals to digital voice command signals, and wherein said speech recognition computer receives said digital voice command signals to determine whether an utterance of a user corresponds to one of a plurality of designated commands for controlling said trolling motor, and wherein said remote unit further includes one or more manually operated keys which can be used to manually control said trolling motor when voice control is not desired; and
  a local unit physically connected to said trolling motor and configured to receive said electrical signals from said remote unit and to control an operation of said trolling motor in response to said voice commands and in response to activation of said one or more manually operated keys.

2. The control system for a trolling motor as recited in claim 1 wherein said analog interface unit further comprises an audio amplification circuit coupled to receive said audio analog voice command signals.

3. The control system for a trolling motor as recited in claim 2 wherein said remote unit further comprises a control computer configured to adjust a gain of said audio amplification circuit depending on a signal level associated with said voice commands.

4. The control system for a trolling motor as recited in claim 1 further comprising a control computer coupled to said speech recognition computer, wherein said speech recognition computer generates a signal indicative of whether said utterance corresponds to said one of said plurality of designated commands.

5. The control system for a trolling motor as recited in claim 4 wherein said control computer generates said electrical signals conveyed via said wireless transmission.

6. A control system for a trolling motor as recited in claim 4 wherein said remote unit further comprises a power control circuit coupled to said control computer, wherein said power control circuit is configured to selectively remove power from said speech recognition computer.

7. A control system for a trolling motor as recited in claim 6 wherein said power control circuit is configured to selectively remove power from said speech recognition computer when said voice commands are not being detected by said remote unit.

8. The control system for a trolling motor as recited in claim 1 wherein said local unit controls the steering function and a speed function of said trolling motor.

9. The control system for a trolling motor as recited in claim 1 wherein said remote unit includes an audible output for feedback to the user.

10. The control system for a trolling motor as recited in claim 9 wherein said audible output comprises a synthesized voice.

11. A trolling motor control system comprising:
  a remote transmitter unit configured to receive voice commands of a user and to convey signals indicative thereof via a wireless transmission, wherein said remote transmitter includes one or more manually operated keys; and
  a local receiver unit including a receiver configured to receive said signals conveyed by said wireless transmission and a motor control system configured to control a speed and turning direction of said trolling motor in response to said voice commands and in response to activation of said one or more manually operated keys;
  wherein said motor control system is configured to steer said trolling motor a designated number of degrees left or right in response to detection of voice commands corresponding to designated left and right voice commands, respectively, and wherein said motor control system is configured to steer said trolling motor a second designated number of degrees left or right in response to detection of voice commands corresponding to additional designated left and right voice commands.

12. The trolling motor system as recited in claim 11 wherein said motor control system is configured to steer said trolling motor approximately 22.5° left or right in response to said designated left and right voice commands, respectively.

13. The trolling motor system as recited in claim 12 wherein the designated number of degrees steered in response to said additional designated left and right voice commands is approximately 90°.

14. The trolling motor as recited in claim 13 wherein said motor control system is configured to cause the trolling motor to reverse the direction in response to a signal indicative of the detection of a REVERSE command, and to re-establish the original direction in response to a signal indicative of the detection of a FORWARD command.

15. The trolling motor as recited in claim 14 wherein said motor control system is configured to increase or decrease the speed of the trolling motor by a designated amount in response to a control signal indicative of the detection of a voice command corresponding to a FASTER or SLOWER voice command respectively; and wherein said motor control system is configured to cause the propulsion to cease in response to a signal indicative of the detection of a voice command corresponding to a STOP voice command record.

16. The trolling motor system as recited in claim 15 wherein said motor control system is configured to set the speed of the trolling motor to one of a plurality of designated speeds in response to each of a plurality of speed commands.

17. The trolling motor as recited in claim 16 wherein said motor control system is configured to cease responding to voice commands in response to a VOICE OFF voice command record.

* * * * *

UNITED STATES PATENT AND TRADEMARK OFFICE
CERTIFICATE OF CORRECTION

PATENT NO. : 5,832,440
DATED : November 3, 1998
INVENTOR(S) : Donald A. Woodbridge and Erik Ruiz It is certified that error appears in the above-identified patent and that said Letters Patent is hereby corrected as shown below:

In the Claims:

Claim 2, col. 12, line 7, after "an audio amplification circuit coupled to receive said" please remove "audio".

Signed and Sealed this

Twenty-third Day of February, 1999

Attest:

Q. TODD DICKINSON

*Attesting Officer*    *Acting Commissioner of Patents and Trademarks*